US012412024B2

(12) United States Patent
Kandari et al.

(10) Patent No.: US 12,412,024 B2
(45) Date of Patent: Sep. 9, 2025

(54) ENHANCED TEXT WRAPPING IN DOCUMENTS

(71) Applicant: ADOBE INC., San Jose, CA (US)

(72) Inventors: Pragya Kandari, Noida (IN); Anurag Singh, Noida (IN)

(73) Assignee: Adobe Inc., San Jose, CA (US)

(*) Notice: Subject to any disclaimer, the term of this patent is extended or adjusted under 35 U.S.C. 154(b) by 4 days.

(21) Appl. No.: 18/358,743

(22) Filed: Jul. 25, 2023

(65) Prior Publication Data

US 2025/0036854 A1   Jan. 30, 2025

(51) Int. Cl.
*G06F 40/109* (2020.01)
*G06F 40/189* (2020.01)

(52) U.S. Cl.
CPC .......... *G06F 40/109* (2020.01); *G06F 40/189* (2020.01)

(58) Field of Classification Search
CPC ..... G06F 40/109; G06F 40/189; G06F 40/103
See application file for complete search history.

(56) References Cited

U.S. PATENT DOCUMENTS

| | | | | |
|---|---|---|---|---|
| 6,081,816 A | * | 6/2000 | Agrawal | G06F 40/103 715/210 |
| 7,315,979 B1 | * | 1/2008 | Walker | G06F 3/0483 358/1.15 |
| 11,170,156 B1 | * | 11/2021 | Arora | G06F 3/04847 |
| 2010/0174985 A1 | * | 7/2010 | Levy | G06F 40/163 715/244 |
| 2011/0179345 A1 | * | 7/2011 | Capela | G06F 40/103 715/209 |

OTHER PUBLICATIONS

Bateman et al., "Towards Constructive Text, Diagram, and Layout Generation for Information Presentation" Computational Linguistics, vol. 27, No. 23, copyright 2001 ACM, pp. 409-449. (Year: 2001).*
Chao, "Text Block Geometric Shape Analysis" DocEng'06, Oct. 10-13, 2006, Amsterdam, The Netherlands, Copyright 2006 ACM, pp. 22-24. (Year: 2006).*
Harkins, S., "How to use the many text wrapping options in Microsoft Word", TechRepublic.com, Published on Apr. 12, 2021, Retrieved from Internet URL: https://www.techrepublic.com/article/how-to-use-the-many-text-wrapping-options-in-microsoft-word/, accessed on Aug. 14, 2023, pp. 11.

(Continued)

*Primary Examiner* — Phuong H Nguyen
(74) *Attorney, Agent, or Firm* — Shook, Hardy & Bacon L.L.P.

(57) ABSTRACT

Embodiments described herein facilitate text wrapping around a text-based glyph in an effective and efficient manner. In embodiments, a text-based glyph is generated within a document. The glyph is generated from a font file that includes glyph data that instruct a document editor how to generate the glyph. Using the glyph data, an intersection between the glyph and a text tile, e.g., a text area boundary where text can be placed, of the document. An insertion location based on intersection is identified, and text is inserted within the text tile at the insertion location, thus providing the effect of wrapping the text around the text-based glyph.

20 Claims, 18 Drawing Sheets

(56) References Cited

OTHER PUBLICATIONS

"Wrap text around objects", Adobe, last updated on Jun. 20, 2023, Retrieved from Internet URL: https://helpx.adobe.com/indesign/using/text-wrap.html, accessed on Aug. 14, 2023, pp. 14.

"Textwrap—Text wrapping and filling", Python, Retrieved from Internet URL: https://docs.python.org/3/library/textwrap.html, accessed on Aug. 14, 2023, pp. 5.

"Glyf : Glyph Data", Glyph Data Table, Retrieved from Internet URL: https://fonttools.readthedocs.io/en/latest/ttLib/tables/_g_l_y_f.html, accessed on Aug. 9, 2023, pp. 5.

"Glyf—Glyph Data Table", Glyf data table (OpenType 1.9)—Typography | Microsoft Learn, Published on Dec. 9, 2021, Retrieved from Internet URL: https://learn.microsoft.com/en-us/typography/opentype/spec/glyf, accessed on Aug. 9, 2023, pp. 12.

"Calculating intersection point of quadratic bezier curve", Stack Overflow, Retrieved from Internet URL: https://stackoverflow.com/questions/27664298/calculating-intersection-point-of-quadratic-bezier-curve, accessed on Aug. 9, 2023, pp. 6.

"The OpenType Font File", (OpenType 1.9)—Typography | Microsoft Learn, Published on Dec. 9, 2021, Retrieved from Internet URL: https://learn.microsoft.com/en-us/typography/opentype/spec/otff, accessed on Aug. 9, 2023, pp. 16.

\* cited by examiner

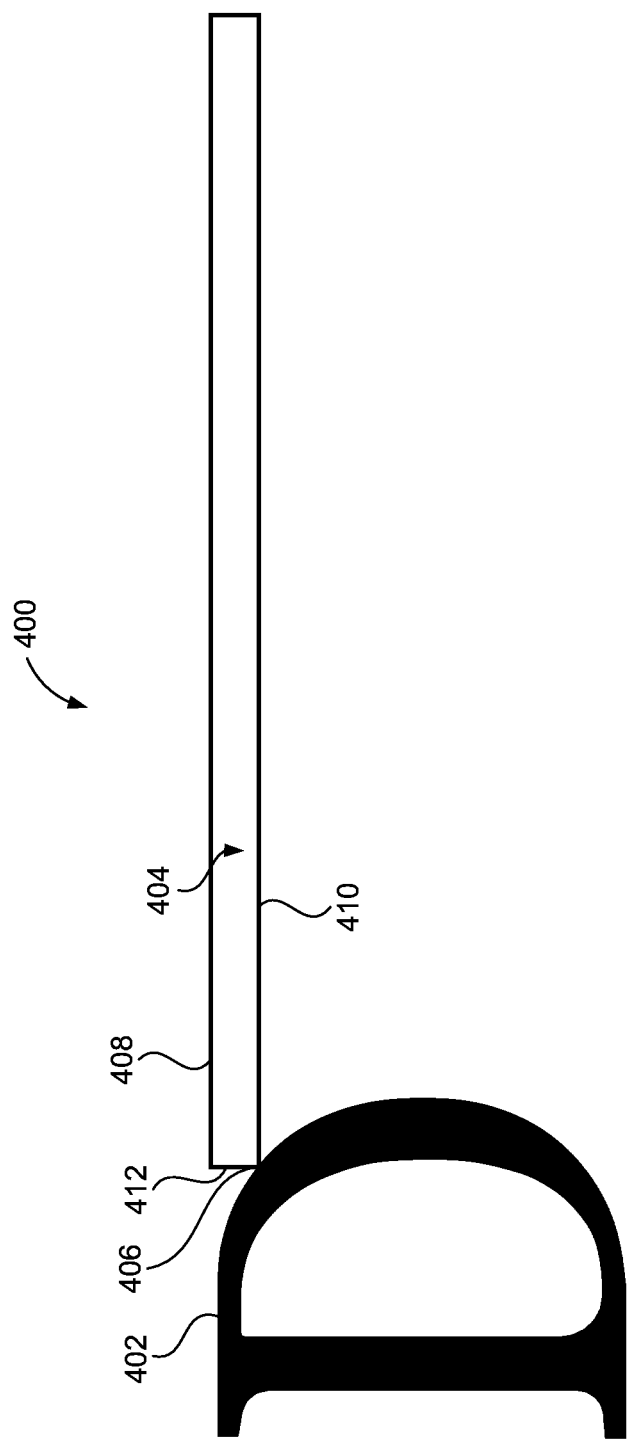

I'm only happy when it rains

*Getting in touch with your moody side can have surprising benefits. says Robert Landrone*

Ut exceatur alit architiorum volum aut archillabo. Nequibusa ad maximus magnatu remporenas as a nes rerchit maximenda persperum quunt aut lariant isitibeaqui te musdam ea quid ullibeatet eritia duscim incipsam, totat adi totae velit es mini veriam, omnimagnatio voloren. Venim quaerum qui berrori conem nus aut quo omnist, que pratis is saepudam, sit quamend aerovide laudir re volupta tiunte molore, qui cum essimendis di utemporum qui si cor aut hilla sim res ma si conetas doles moluptur? Quissim dipis que am dem quodi illorument ea vel ipis es incius els eos sima ni diam, sin prae conem adit poribus, officat emporem aci nimpop orporerum re et la volorep ed ea ero blaut as ipitia nia vendes eos doluptaquat volum nos paribea nos cost venecumque corundis quam que consed molore ped ut as assi illbust ea nes vel moluptisi te con commini, voluptat dolorep erumque pro et arciasitibus dolupta tempore henimaximint quo officae ne ipsume nobis conse voloratur, id explam illupta quid quas sequos aut quam iliquas velenisquae voluptasi at atem quo berae. Cis et modiat volum impopo riatuscid mos eatis net eriae mincto optatest, sapercis porepudita dolupta apicis quodithus, volupta velicil est explatem sunt fugitur? Il ipsam autemporios idque lamus, omnit labo. Totatemporum ati iduciasperi con pro qui dolore estinvelit omnisime officiliam, offictutrio. Et quodmillo velliqu asitius anditi volupur?

Ectecae volorat eutsdan daniendebit illeceant, in re volore, net fuga. Facerepro cunqui odigandam quiaernam harum qui velest possima gnimillluptate pla quid unte et omnisqu atusdae. Ulparci veliquiatet escus voloeicia a con cupta sunt adi vit hanumet repudam, quam et apelis sant ommodis serferum eum autemperisi fuga. Ita quis aut et omnim del esttusa menduciunt, ute et am fuga. Conecto rectem untur, unt qui core atatur?

Officipici omnis eum eatemperit unt rem hic totaquodi venient, ut odi accus alit, officiis utem nem sandandit expe mincdat atem. Ut debis antectem nime am erferepudit ipsaust, quae resto occusci alit, sedis andendit il eium rectur sit experit quis alia simaxim porehendeles ium eum enis qui dolectota sit audam, que vit ariorro omniunt dolupam am qui aligenis eos ea nisquae. Pissus ullaut pe sequid quasi dolorerore volorum quatem. Ipsa sandia sae natus.

To. Nam reptam, sitibustrum acea venetur?

Ugitium qui nis ad es endam, exerum simillendipsae modis quam velicab imusto eum enem et hanumquosa vitatas est laborat et quat.

Ovid earunt, quatrurem ullorias atem vel ipsant.

Adi tem. Onsequi debis aut ex etus suntotate autem quos ex et qodisci conum hillessit utemqu ntione lab ide seque pore, nonsectur archit quia sum hictationse est fugiant dohupta sperio illam net omni nos at. Patum si porbita nterdi, Cupio, Cat. Ahaci pro vis, ituravo, nontutelinde coniti, erficas menatus, quam nox mihille stessides ad sim sidica se, nos borsum inatro videlici ia atre, factus hiliam, quam poportem audem ocri sendio eo et, nos, consulicate nonsce corei senatuncta, C. Onfenam diendem mo hus horit, stra res cae furorum loc, note de telles Maed iur ub- Ut exceatur alit architiorum volum aut archillabo. Nequibusa ad maximus magnatu remporenas as a nes rerchit maximenda persperum quunt aut lariant isitibeaqui te musdam ea quid ullibeatet eritia duscim incipsam, totat adi totae velit es mini veriam, omnimagnatio voloren. Venim quaerum qui berrori conem nus aut quo omnist, que pratis is saepudam, sit quamend aerovide laudi re volupta tiunte molore, quicum essimendis di utemporum quisi cor aut hilla sim res ma si conetas doles moluptur? Quissim dipis que am dem quodi illorument ea vel ipis es incius els eos sima ni diam, sin prae conem adit poribus, officat emporem aci nimpop orporerum re et la volorep ed ea ero blaut as ipitia nia vendes eos doluptaquat volum nos paribea nos cost venecumque corundis quam que consed molore ped ut as assi illbust ea nes vel moluptisi te con comlorep erumque pro et arciasitibus dolupta tempore henimaximint quo officae ne ipsume nobis conse voloratur, id explam illupta quid quas sequos aut quam iliquas velenisquae voluptasi at atem quo berae. Cis et modiat volum impopo riatuscid mos eatis net eriae mincto optatest, sapercis porepudita dolupta apicis quoditibust, volupta velicil est explatem sunt fugitur?

Il ipsam autemporios ti iduciasperi con pro qui dolore estinvelit omnisime officiliam, offictutrio. Et quodmillo velliqu asitius anditi volupur?

Ectecae volorat eutsdan daniendebit illeceant, in re volore, net fuga. Facerepro cunqui odigandam quiaernam harum qui velest possima gnimillup tate pla quid unte et omnisqu atusdae.

Ulparci veliquiatet esecus volo eicia a con cupta sunt adi vit hanumet repudam, quam et apelis sant ommodis serferum eum autemperisi fuga. Ita quis aut et omnim del esttusa menduciunt, ute et am fuga. Conecto rectem untur, unt qui core atatur?

Officipici omnis eum eatemperit unt rem hic totaquodi venient, ut odi accus alit, officiis utem nem sandandit expe mincdat atem. Ut debis antectem nime am erferepudit ipsaust, quae resto occusci alit, sedis andendit il eium rectur sit experit quis alia simaxim porehendeles ium eum enis qui dolectota sit audam, que vita forro omniunt dolupam am qui aligenis eos ea nisquae. Pissus ullaut pe sequid quasi dolorerore volorum quatem. Ipsa sandia sae natus.

To. Nam reptam, sitibustrum acea venetur?

Ugitium qui nis ad es endam, exerum simillendipsae modis quam velicab imusto eum enem et hanumquosa vitatas est laborat et quat.

Ovid earunt, quatrurem ullorias atem vel ipsant.

*FIG. 13.*

ENHANCED TEXT WRAPPING IN DOCUMENTS

BACKGROUND

Text wrap is a functionality provided by a word processing software that allows users to surround a graphic with text. Text wrap causes text to wrap around the graphic so that the graphic does not interfere with line spacing.

SUMMARY

At a high level, aspects of the technology wrap text around a text-based glyph, which allows tight text wrapping along glyph edges that are calculated from glyph data. This is in contrast to wrapping text around an image-based object, where image boundaries often do not represent the edges of an object within the image, and which are typically square or rectangular in nature. In practice, this allows a user to easily change the text-based glyph, and the text wrapped around it, without having to edit image boundaries for an image-based object along which the text is wrapped.

In one example operation, a glyph is generated within a word document using a document editor. The glyph may be any text-based glyph generated from a font file, such as a language character, emoji, and so forth.

The font file provides glyph data from which the document editor can generate the glyph. The instructions provided by the glyph data comprise information, such as control points, curves, and other instructions that define the glyph, including the outline or edge of the glyph.

Text tiles, e.g., text area boundaries, are located within the document and identify locations within the document where text can be placed. Using the glyph data, the locations where the text tiles intersect the glyph are determined. An insertion location, where text is inserted within the text tile, is located based on the intersection. Text is inserted at the insertion location, and the inserted text extends within the text tile away from the glyph. This gives the text the appearance of wrapping around the glyph.

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIG. 4A illustrates an example glyph and a corresponding text tile intersecting the glyph, in accordance with an aspect described herein;

FIGS. 7-13 illustrate various documents having various examples of glyphs wrapped by text, in accordance with aspects described herein;

DETAILED DESCRIPTION

Figure 1:
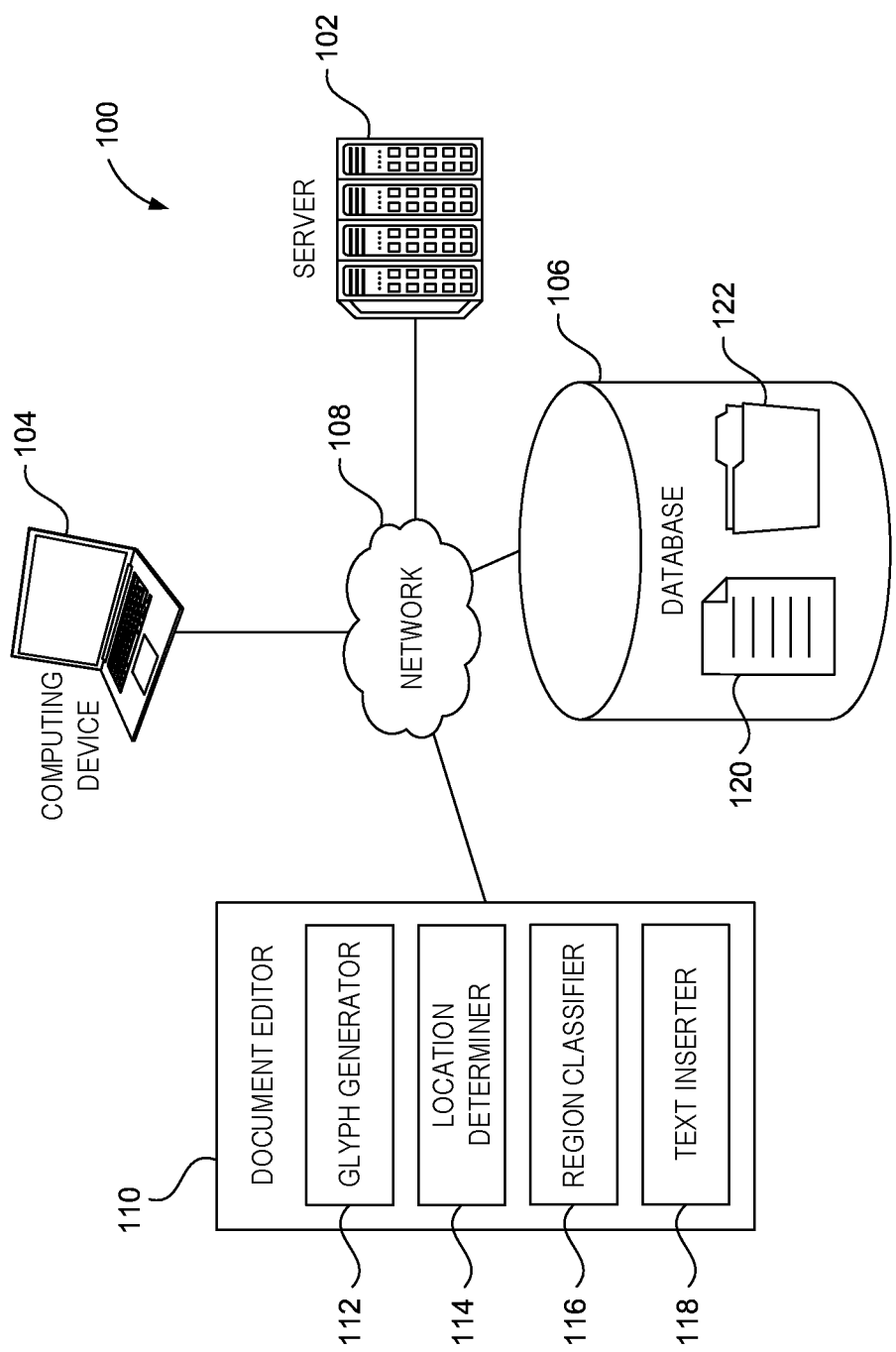
FIG. 1 illustrates an example operating environment in which aspects of the technology can be employed, in accordance with an aspect described herein.

Text wrap is the functionality provided by word processing software that allows text to surround a graphic or object within a document. Conventional methods of text wrap generally include text surrounding a target object that is in a graphic format. These conventional methods are manual and tedious, and in many cases, require incremental manipulation of images or text. These manipulations are often visually based changes, which can lead to errors, particularly at high resolutions or increased scale.

To wrap text around a glyph using conventional methods, the glyph is converted to an image, and the text is wrapped around the boundaries of the image. In most cases, the image boundaries (e.g., rectangular) on which the text is wrapped is not the same as the edges of the glyph (e.g., non-rectangular). As a result, text is not wrapped tightly with the glyph edges, leading to text that is generally wrapped in a rectangular manner.

An existing workaround to this problem is to create an outline for a boundary around an object, such as the glyph within the image, so that the image boundaries are roughly the same as the object's boundaries. The outline is represented as a vector. In such a case, the letter could be treated as a graphic using the outline defined around the glyph. This technique is typically applied after the text is in a desired form. Otherwise, changes to the text generally requires a change to the glyph, thereby resulting in a restructuring of the boundary and representing the new glyph as a new image graphic. Similarly, when modifying a font, the font modification can cause the letter to be represented as a different shape, thus needing different image boundaries. Further, a change to the font size would typically require rescaling of the image-based glyph, which can also result in modification of the previously determined boundaries for the image based on the glyph's edges.

Moreover, when objects, such as glyphs are represented as an image for wrapping text, it often limits or eliminates the ability to apply or change text-based properties to the object in the image. For instance, a user might not be able to apply a new font or font size, or other property, such as bold, italic, or underline, to the object. Instead, the object must be redrawn or modified using an image editor, have new image boundaries defined to match the changes, and reintroduced back to a document as an image-based glyph.

The problem is further aggravated when the fonts used in the document are a decorative type script. In these cases, there may be no lookalike graphic to use as an image within the document editor. As such, defining the image-based edges of the glyph with these decorative scripts is a time-consuming, manual method. Further, glyph modifications, such as changing the sizing or font, generally requires reapplication of the manual process to define new image boundaries based on the glyph edges.

In many cases, such as publishing books, changing the text when it is represented as a graphic also changes the amount of space available for text. This could lead to other spacing issues, as text is reoriented within the document.

Typically, with conventional word processing software systems, when making changes to image-based glyphs, an external application for designing object properties is usually needed. The object designed or modified in these external image-editing applications is imported to the word processing software. This too has drawbacks, as any changes to the object, such as an image-based glyph, desired in the word processing software must be made in the external application and then reimported into the word document edited using the word processing software.

In cases where an external application is used to make changes, it is difficult to prevent the text from going inside the vector bounds, such as those defining interior features of a glyph. Further, this method typically does not provide the precise control to include or exclude inner edges of an image-based glyph. As such, additional manual changes within the word processing software are typically required to make the necessary adjustments after importing the image into the document.

Moreover, aspects of the present technology reduce the document size relative to conventional methods. In conventional image-based methods, an image-based glyph of a quality suitable for document publication requires significantly more storage space than a text-based glyph, since the text-based glyph is calculated from glyph data as opposed to rendered as an image. This problem is exacerbated when increasing the size or quality of a glyph, since doing so to an image-based glyph significantly increases file size, while doing so to a text-based glyph generally does not. Compared to conventional methods, this preserves computational resources when processing such documents, and further preserves storage space on memory devices.

Accordingly, the technology described relate to live text wrapping to textual features in an automated manner. In this way, text wrapping is applied to text itself (e.g., a text-based glyph) in an efficient and effective manner. In particular, to apply live text wrapping, text is wrapped around a text-based object determined by glyph data from a font file. The text wrapping features described herein allow users to continuously edit a document, yet change or edit textual features around which text wrapped. Thus, instead of wrapping around the boundaries of an image (e.g., in a rectangular manner), the edges of a text-based glyph can be calculated and used to determine where to place the text surrounding the glyph (e.g., in a non-rectangular manner). By doing so, no adjustments need to be made to an image-based glyph to apply the text. Instead, changes can be made to the glyph, and the edges automatically calculated for wrapping text. The glyph can be changed entirely, and image-based adjustments can still be avoided. This allows a user to continually edit a document, including the object glyph on which text is wrapped instantaneously, and without the need for an additional image-editing application. Applying the wrap around live text itself can yield a more refined, professional look, without the extensive need for image editing required by many of the conventional methods.

One such method that solves many of these problems wraps text around a text-based object, e.g., a glyph generated by glyph data from a font file. That is, the text is wrapped around itself and provides the user with a continuous text wrapping by calculating the edges of the glyph around which the text is wrapped.

To do so, a glyph is generated. The glyph is generated in a document by a document editor, such as a word processing software. The glyph is generated by accessing glyph data within a font file. The glyph data is used to calculate the glyph when rendered on the document by the document editor. The document includes text tiles that are locations of the document where the document editor can insert and maintain text. The text tiles identity text locations within the document where text is located or can be located.

An intersection between the glyph and the text tile is calculated using the glyph data of the font file. The edges of the glyph are calculated from the glyph data. A location where the edge of the glyph intersects a text tile is identified as the intersection.

Text can then be inserted within the text tile based on the intersection. That is, an insertion location within the text tile can be determined based on the intersection. For instance, the text insertion location may be spaced apart from the intersection location within the text tile. The text is inserted at the insertion location.

Advantageously, as noted, the methods described herein allow a user to wrap text around a text-based glyph in such a manner that the text-based glyph can be easily modified, and the wrapping automatically applied to the modified glyph without the need for significant image processing techniques.

It will be realized that the method previously described is only an example that can be practiced from the description that follows, and it is provided to more easily understand the technology and recognize its benefits. Additional examples are now described with reference to the figures.

With reference now to FIG. 1, an example operating environment 100 in which aspects of the technology may be employed is provided. Among other components or engines not shown, operating environment 100 comprises server 102, computing device 104, and database 106, which are communicating with document editor 110 via network 108.

Database 106 generally stores information, including data, computer instructions (e.g., software program instructions, routines, or services), or models used in embodiments of the described technologies. Although depicted as a single database component, database 106 may be embodied as one or more databases or may be in the cloud. In aspects, database 106 is representative of a distributed ledger network. Some computer storage devices suitable for use by database 106 to store information are further described with respect to FIG. 16.

Network 108 may include one or more networks (e.g., public network or virtual private network [VPN]), as shown with network 108. Network 108 may include, without limitation, one or more local area networks (LANs) wide area networks (WANs), or any other communication network or method.

Generally, server 102 is a computing device that implements functional aspects of operating environment 100, such as one or more functions of document editor 110 to wrap text using glyph data. One suitable example of a computing device that can be employed as server 102 is described as computing device 1600 with respect to FIG. 16. In implementations, server 102 represents a back-end or server-side device.

Computing device 104 is generally a computing device that may be used to edit documents using document editor 110. As with other components of FIG. 1, computing device 104 is intended to represent one or more computing devices. One suitable example of a computing device that can be employed as computing device 104 is described as computing device 1600 with respect to FIG. 16. In implementations, computing device 104 is a client-side or front-end device. In addition to server 102, computing device 104 may implement functional aspects of operating environment 100, such as one or more functions of document editor 110. It will be understood that some implementations of the technology will comprise either a client-side or front-end computing device, a back-end or server-side computing device, or both executing any combination of functions from document editor 110, among other functions.

As noted, computing device 104 may employ aspects of document editor 110 to wrap text around a text-based glyph. In doing so, text may be wrapped closely to the glyph based on determining where the glyph intersects text tiles where text can be placed, as will be further described.

Figures 2A, 2B:
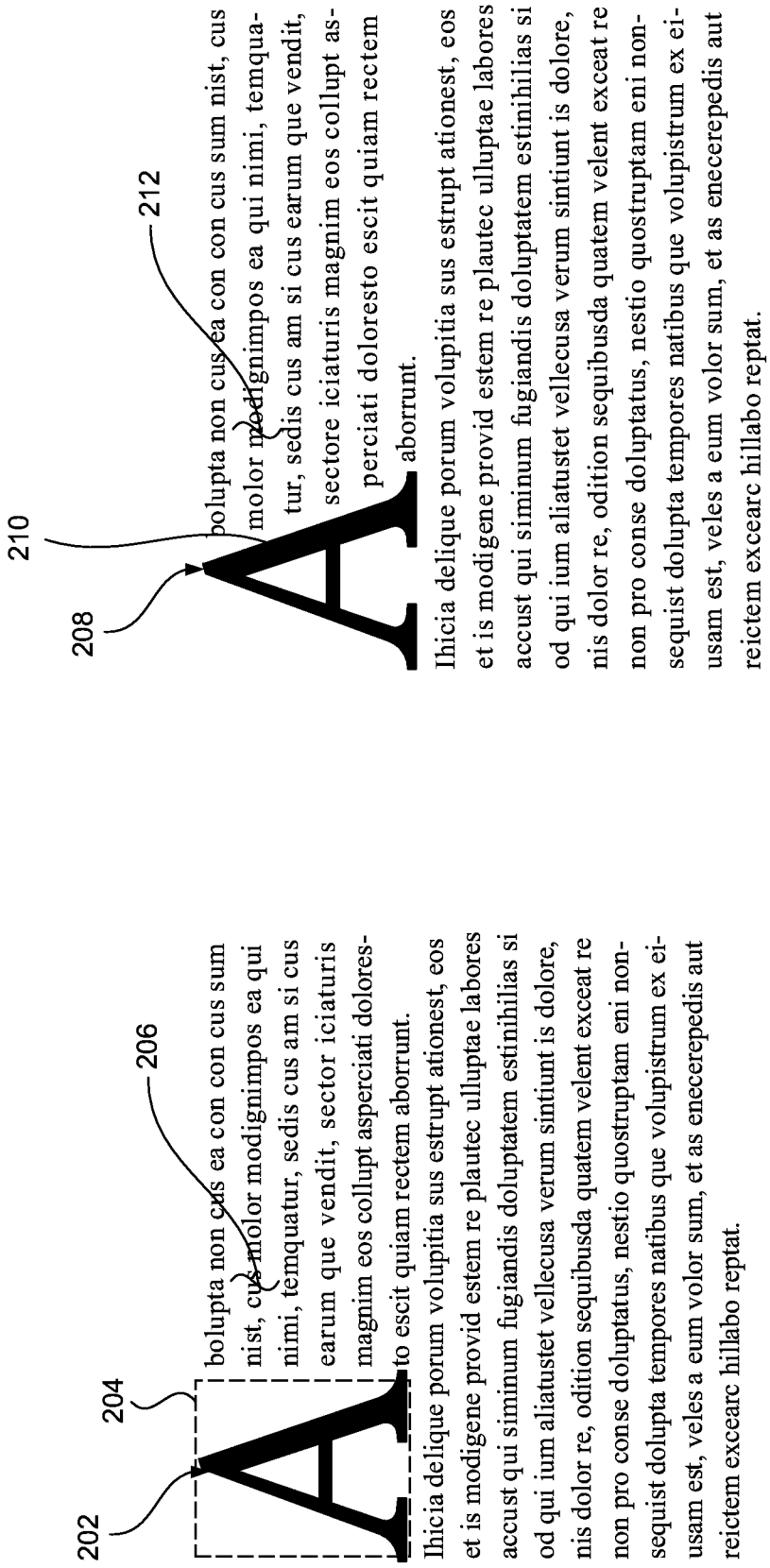
FIG. 2A illustrates a document having an example image-based glyph wrapped by text, in accordance with an aspect described herein.
FIG. 2B illustrates a document having an example text-based glyph wrapped by text, in accordance with an aspect described herein.

By way of example only, and with reference to FIGS. 2A and 2B, FIG. 2A and FIG. 2B provide contrasting illustrations that show examples of text wrapping. FIG. 2A presents wrapped text around glyph 202, illustrated as an "A." This illustrates one example of an image-based text wrapping where glyph 202 is an image that is defined by theoretical boundary 204. Text 206 is wrapped around theoretical boundary 204.

In contrast, FIG. 2B illustrates glyph 208 with text 212 wrapped around glyph edge 210 based on calculating glyph edge 210 and determining where it intersects text tiles within which text 212 is located.

Computing device 104 may launch document editor 110 and start or retrieve document 120 in which glyphs, such as those illustrated in FIG. 2B, may be rendered. In general, document editor 110 allows computing device 104 to generate, e.g, apply or edit, text in a document, such as document 120 stored in database 106. Document editor 110 may include word processors or graphic design applications, and provide tools for manipulating and formatting glyphs. Using document editor 110, computing device 104 can change the font, select specific glyphs, adjust their size or color, and apply other formatting options to enhance the visual representation of text within a document.

In general, a glyph is a text-based character that can be generated and positioned within document 120. Glyph generator 112 is employed to generate a glyph. A glyph refers to the visual representation of a character or symbol that is text based. Text is generally used to mean one or more glyphs. When rendered, a glyph is the specific shape or image that appears on document 120. A glyph can be generated in response to an input, such as rendering a character corresponding to a character on a keyboard used as an input. Other inputs may be used to prompt generation of glyphs as well.

To generate a glyph, glyph generator 112 accesses font file 122 to retrieve glyph data. Font file 122 is a file that comprises glyph data corresponding to a particular set of glyphs. Font file 122 may be in TrueType (.ttf) or OpenType (.otf) format, which contains glyph data about the particular font, including the outlines or shapes of each glyph, although other file types are contemplated and may be usable. As an example, an OpenType font file contains glyph data, in table format, used for rendering text-based glyphs. Portions of the data are used by applications to calculate the layout of text using the font, e.g., the selection of glyphs and their placement within a text tile of a document 120, which will be further described.

Glyphs, as used herein, are text based. As an example, text-based glyphs can be generated as a Unicode character set, such as UTF-8. When generating the glyph for rendering in a document, such as document 120, inputs are converted into Unicode values. Each glyph corresponds to a specific Unicode code point, which represents a particular character or symbol. Each glyph corresponds to a specific character, such as a letter, number, punctuation mark, or special symbol, such as an emoji or other similar text-based representation. Glyphs can have different sizes, styles, and appearances within a font, as determined from font file 122. For example, a font may have multiple versions of the same character with variations in weight (e.g., bold, regular, italic) or width (e.g., condensed, expanded). These different glyph variations allow for the rendering of text in various styles and typographic effects.

The Unicode values are mapped to glyph indices within font file 122. This mapping is done through tables and encoding schemes defined in font file 122. Font file 122 provides the information to associate each Unicode character with its corresponding glyph index. Glyph generator 112 generates the visual representation of the glyph by drawing on document 120. This process may involve rasterizing or vectorizing the glyph outlines, applying font-specific hinting instructions (if present), and rendering them within document 120 having attributes such as color, size, and style. Glyph data within font file 122 may include control points, curves, and other instructions that define the outline of the glyph, such as Bézier Curves, which are mathematical curves defined by the control points and handles, and may be used by glyph generator 112 to generate the visual representation of the glyph within document 120.

Turning briefly to document 120, in a specific example, document 120 is a Word document, e.g., a .doc or .docx file. However, it is contemplated that document 120 could include other document types in which glyphs are rendered. Some document types that may also be suitable include those from plain text (.txt), rich text format (.rtf), tabular documents (e.g., .xls, .xlsx) or CSV (comma-separated values), presentations (e.g., .ppt, .pptx, .odp), and the like.

Document 120 comprises text tiles, sometimes referred to as "text area boundaries." In the context of word processing, a text tile, e.g., a text area boundary, typically refers to the defined limits within which text, including individual glyphs, is located or can be located. It represents the area where text can be entered, edited, or displayed within a document. The text tiles determine the visible space and layout of the text within document 120.

The text tile may be determined by various factors, including the margins, page size, and other formatting options provided by document editor 110. The boundaries of the text tiles are established layout settings within document editor 110, which may define the available width and height for text placement. In some cases, text tiles are background locations and not visible as part of document 120 when rendered on a display device of computing device 104.

Generally, text tiles maintain organization and readability of the document containing the text within the defined area. They may also aid in determining where line breaks, page breaks, and other organizational features occur. The boundaries of text tiles can be adjusted by modifying the page setup options, adjusting margins, or inserting additional elements like text boxes or image-based objects.

Figures 3A, 3B, 3C:
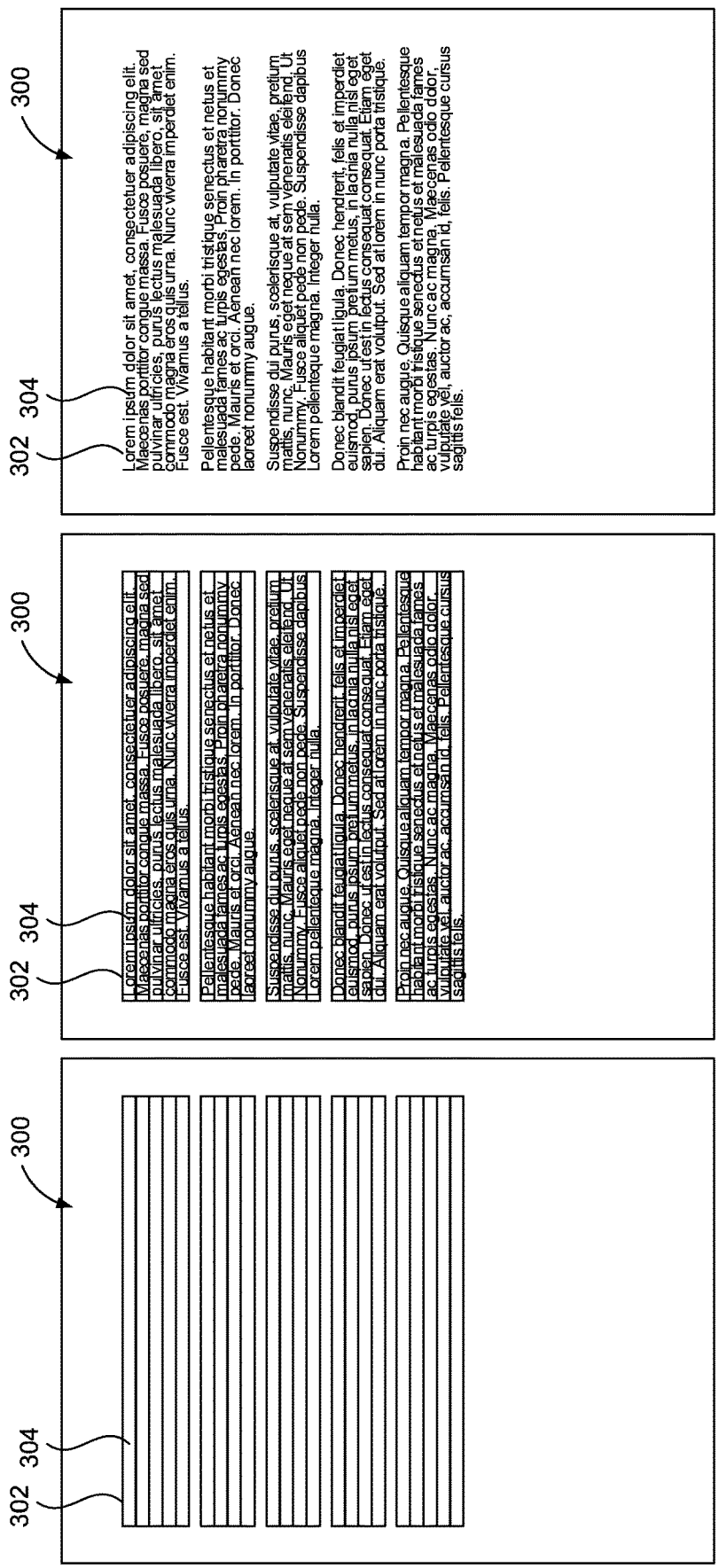
FIGS. 3A-3C illustrate an example document showing text within respective text tiles, in accordance with an aspect described herein.

FIGS. 3A-3C provide various illustrations of document 300 showing text tiles with corresponding text located therein. FIG. 3A illustrates document 300 having text tiles. As illustrated, the text tiles are boundaries that are, in this example, defined by the margins of document 300. The text tiles illustrate locations within which text can be located. Text tile 302 is one specific example within the text tiles. In general, document 300 may have any number of text tiles, which may be in any orientation based on configurable features within document editor 110, as previously noted. This is just one example to aid in illustrating example text tiles.

FIG. 3B illustrates the same document 300, but includes text located within the text tiles. In this example, and in many cases, each text tile defines the boundaries for a single line of text. A text tile may extend in a direction across which the text of a particular language flows. For instance, in the English language, a text tile may extend horizontally to define the location across which text is placed when inserted. Said differently, the upper and lower boundaries of the text tile may be defined by the text font size, while the lateral boundaries may be defined by margins or other objects within document 300. In this case, the text may extend within the text tile in a single line between the lateral boundaries. As shown, text tile 302 includes text 304. As noted, the text tiles define the overall structural layout of the document with respect to where text is located or can be located.

When viewing the document rendered at an interface, the text tiles may not be visible. That is, the boundaries of the text tiles illustrated and described in the figures could be theoretical in nature. A text tile may be defined based on its location, but not visible when rendering the document. That is, a text tile may also include an algorithm that instructs document editor 110 as to the location within a document where text is to be located. Turning to FIG. 3C, the text, such as 304, is illustrated without a visualization of the text tiles boundaries. The text assumes the structure defined by the text tiles when located within the document.

To wrap text around a text-based glyph, location determiner 114 can be employed to determine a location used for inserting text relative to a generated glyph. For instance, location determiner 114 can be used to determine, from the glyph data of font file 122, an intersection between a glyph and a text tile that is used to position text near the glyph in a manner that appears to wrap the text around the text-based glyph. Location determiner 114 can further be employed to determine an insertion location within the text tile based on the intersection, which will be used by other components of document editor 110 to insert the text that is wrapped around the glyph.

To determine the location of the intersection between a glyph and a text tile, location determiner 114 (e.g., in coordination with glyph generator 112) can determine the location of the edges, e.g., the outline, of a generated glyph from the glyph data. As noted, the glyph data may include control points, curve segments, and Bézier curve instructions. These instructions provide document editor 110 the necessary information to render the glyph. By processing the control points, curve segments, and Bézier curve instructions according to the configurable document editor features, such as font size, applied font characteristic (bold, italics, underlining, etc.), color, and the like, the edge locations of the glyph are known. As an example, to calculate the glyph edge, a font file (e.g., a .ttf or .otf file), such as font file 122, may be loaded. The glyph is parsed via the table provide in the font file to extract the shape of the glyph. Quadratic curves are determined using the shape of the glyph and the coordinates of the glyph, thus identifying the glyph edges.

Location determiner 114 can further be employed to determine the location, e.g., the boundaries, of a text tile. In general, text tiles may include boundaries that can be defined based on settings in document editor 110. For instance, text tiles may have boundaries defined by the margins, or other objects on the document. This provides a relative location of each text tile in the document. For instance, a left and right margin set at one inch may respectively define the left and right horizontal boundary locations of the text tile. The vertical boundaries, upper and lower, may be defined based on font size, paragraph spacing, and other vertical features in the document. Thus, the vertical boundary locations for a text tile may be determined based on the relative position of the vertical features in the document. For instance, the location of an upper boundary of a text tile may be positioned below another text tile having a known vertical distance that is immediately below a one-inch header. Based on the aggregate vertical length of these features, the location of the upper boundary is identified. The lower boundary location can be determined by the font size for text located, or to be located, within the text tile. In some cases, this may be defined using an x-y coordinate positioning system on the document. In one example, a text tile may be calculated by adding the bounding boxes of each glyph. The bounding box may be the maximum area used by a glyph. The text tile is represented as a rectangle in 2D space. The intersection of the 2D text tile can then be determined.

Having determined the location of the glyph and the location of a text tile, an intersection of the glyph and the text tile can be determined by location determiner 114. For instance, where the location of a text tile boundary and a location of a glyph edge are the same, the location is identified as the intersection between the glyph and the text tile. This may be done for any number of text tiles within a document.

Figure 4B:
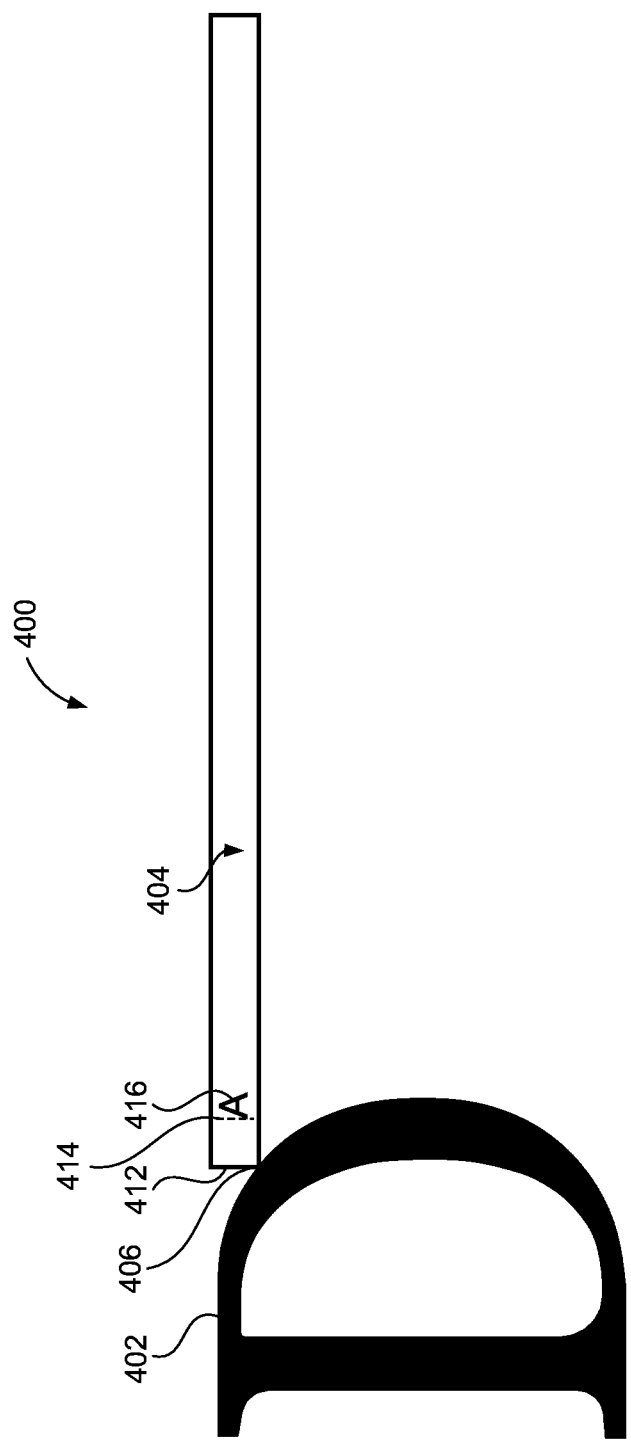
FIG. 4B illustrates the example glyph of FIG. 4A having text inserted within the text tile, in accordance with an aspect described herein.

To illustrate, FIGS. 4A-4B are provided to show document portion 400 having a glyph 402 and text tile 404 for which intersection 406 has been determined using location determiner 114. As illustrated, text tile 404 comprises upper boundary 408 and lower boundary 410. In some cases, a first boundary of a text tile may be defined based on a second boundary of the text tile intersecting a glyph. In this example, lower boundary 410 has intersected glyph 402 at a location different from upper boundary 408. As such, upper boundary 408 has been defined based on the intersection of intersection 406 with glyph 402. In some cases, an intersection may define a new lateral boundary for a text tile, where the new lateral boundary corresponds in location with the intersection. In the example illustrated, lateral boundary 412 is defined based on intersection 406. The new lateral boundaries determined based on the intersection location are used to define the text tile where text can be located. As such, when text is located within the text tile, the text has the appearance of closely wrapping around a glyph, such as glyph 402.

Location determiner 114 may further identify an insertion location, which identifies a location where text can be inserted within a text tile. The insertion location can be determined based on the intersection of the text tile and the glyph. As an example, location determiner 114 determines an insertion location based on a lateral boundary of the text tile. The insertion location may be identified by location determiner 114 by spacing the location insertion a distance away from the intersection between the text tile and the glyph at which the lateral boundary is located. Depending on the word processing program, this spacing may be a defined number of pixels or a defined length from the intersection. In an aspect, the distance at which the insertion location is spaced from the intersection is a configurable option, allowing the user to adjust the distance, thereby providing a mechanism by which a user, via computing device 104, can adjust how tightly wrapped the text appears around the glyph.

FIG. 4B illustrates one example. FIG. 4B illustrates glyph 402 of FIG. 4A relative to text tile 404. Here, location determiner 114 has placed insertion location 414 within text tile 404 and spaced apart from intersection 406. Text 416 can be placed at insertion location 414 and extend within text 416 in a direction away from intersection 406 or lateral boundary 412, as will be further discussed with reference to text inserter 118.

As noted, documents may have any number of text tiles. This allows text to be placed at various locations within the document. For instance, text can be placed within vertically stacked text tiles to create horizontal lines of text across a document, as text is placed within each text tile extending from lateral boundary to lateral boundary. In such cases, text can be placed at different insertion locations for different text tiles that are each determined based on their respective intersections with a glyph. This gives the appearance of wrapping around the glyph as text is inserted within the document.

Figure 5A:
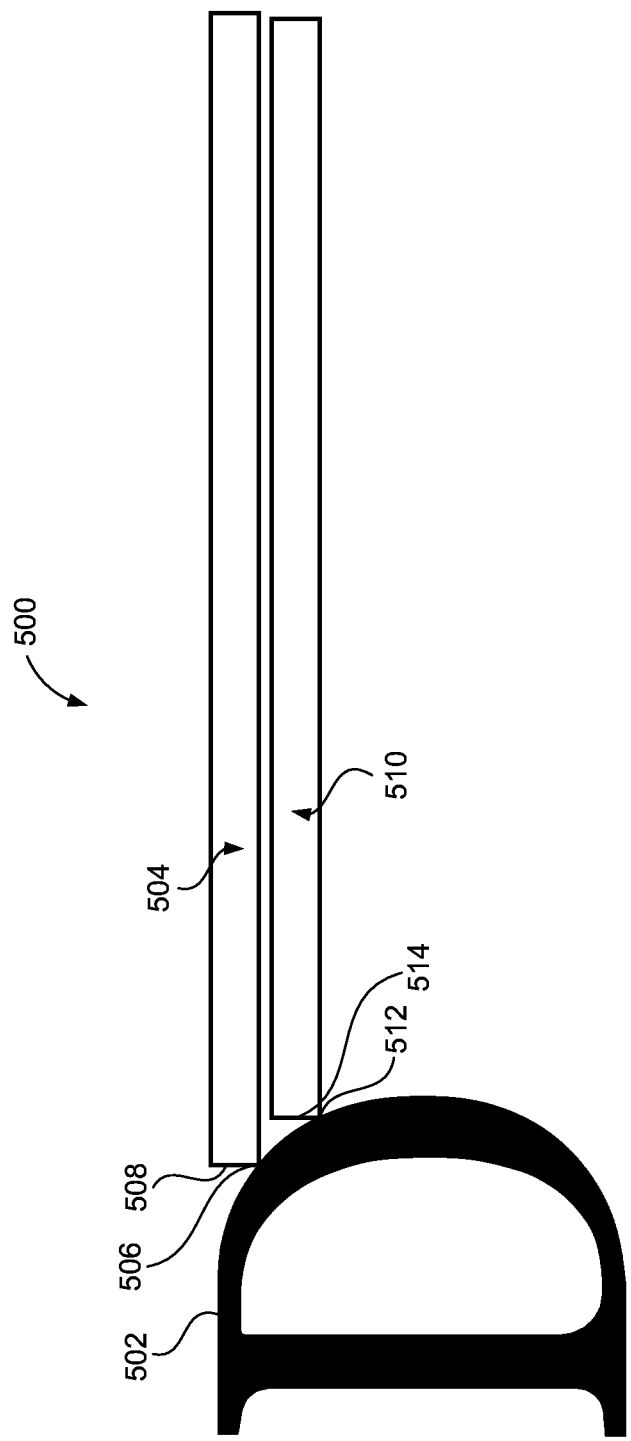
FIG. 5A illustrates an example glyph and a corresponding plurality of horizontally offset text tiles intersecting the glyph, in accordance with an aspect described herein.
Figure 5B:
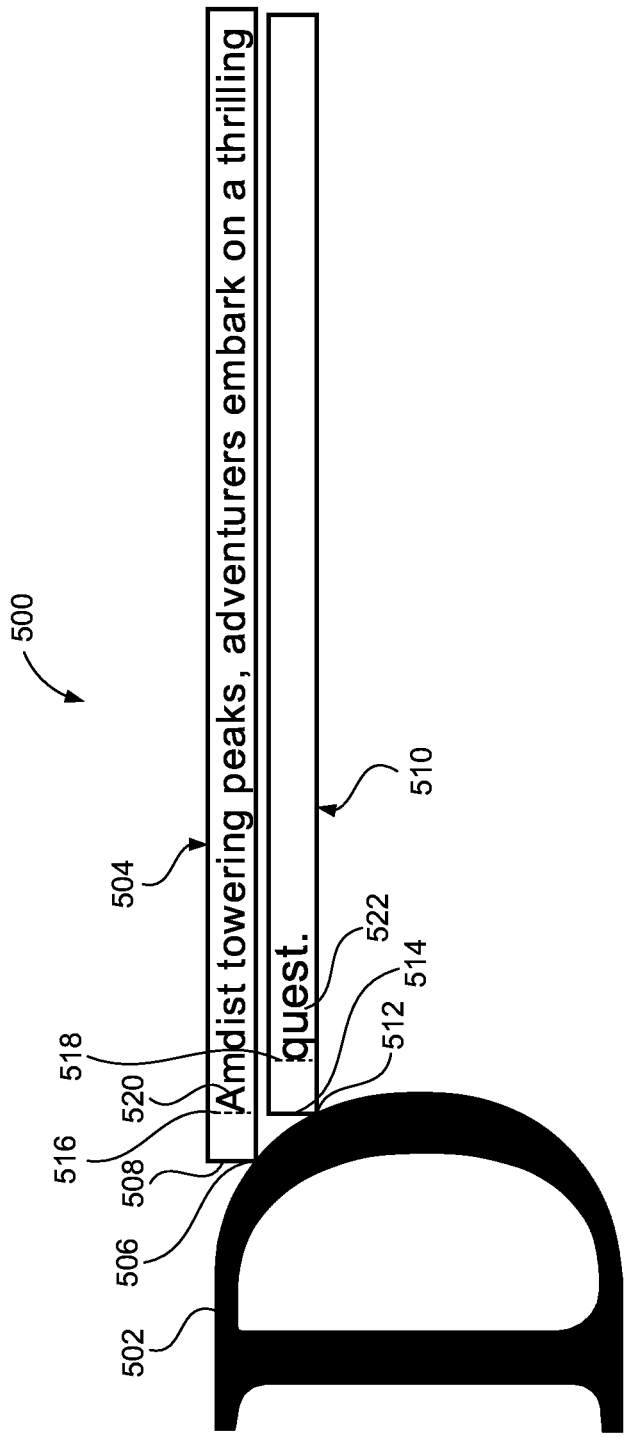
FIG. 5B illustrates the example glyph of FIG. 5A having text inserted within the plurality of text tiles, in accordance with an aspect described herein.

An example of this is illustrated in FIGS. 5A-5B. FIG. 5A shows document portion 500, which includes glyph 502. Here, first text tile 504 intersects glyph 502 at first intersection 506. First intersection 506 may be determined using methods previously described. That is, first intersection 506 may be determined from the glyph data within a font file from which glyph 502 was generated. As previously described, first lateral boundary 508 of first text tile 504 may be determined based on first intersection 506.

In this example, a second text tile 510 is placed immediately below first text tile 504 in the document when text tiles are vertically stacked within the document, as illustrated in document portion 500. For example, second text tile 510 may be positioned vertically adjacent to and parallel with first text tile 504. Here, second text tile 510 intersects first intersection 506 at second intersection 512, identifying the location of second lateral boundary 514, which can be determined using methods previously described. Due to the structure of the edges of glyph 502, first lateral boundary 508 and second lateral boundary 514 are horizontally offset. Horizontally offset generally refers to a document, such as one from which document portion 500 is derived, that extends in the horizontal direction from a first lateral side to a second lateral side. Objects, such as first lateral boundary 508 and second lateral boundary 514, are horizontally offset when they measure different distance from either lateral side of the document. Thus, for instance, first lateral boundary 508 may be relatively closer to a first lateral side of a document compared to second intersection 512, and thus, the two are said to be horizontally offset from one another.

As shown in FIG. 5B, location determiner 114 can determine the locations of any insertion locations within text tiles. As illustrated, first insertion location 516 has been identified within first text tile 504, while second insertion location 518 has been identified within second text tile 510. This can be done using methods previously described, such as determining the insertion locations based on a distance from first intersection 506 or first lateral boundary 508, and from second intersection 512 or second lateral boundary 514 respectively. Based on the structure of 502, as determined from its corresponding glyph data, first insertion location 516 and second insertion location 518 are horizontally offset.

Text can be inserted at the insertion locations. Here, text 520 is inserted at first insertion location 516 and extends away therefrom within first text tile 504. Additionally, additional text 522 is inserted at second insertion location 518 and extends away therefrom within second text tile 510. Additional text tiles beyond those illustrated in FIG. 5A and FIG. 5B may be vertically stacked and text inserted within, thus wrapping the text around glyph 502.

Some glyph geometries, e.g., the structure defined by an edge of the glyph, create various geometrical regions that can allow text to be wrapped in various manners. Region classifier 116 may be employed to classify the regions of a glyph so that text can be inserted according to the classified region.

In some cases, region classifier 116 may classify geometrical regions of a glyph based on the glyph data. That is, the glyph data may include information identifying certain geometrical features, such as closed interiors, hooks, and the like. In such cases, region classifier 116 may classify a region of a glyph in a manner corresponding to that identified by the glyph data. Some example regions include inner regions and outer regions. An inner region comprises a location within a glyph that is at least partially enclosed by the glyph. In a specific case, the inner region is entirely enclosed by edges of the glyph. An outer region is an area outside the glyph that is not enclosed by the glyph edges and that extends away from the glyph to an edge of a document that includes the glyph.

In another aspect, regions are identified and classified using the control points and Bézier curve instructions present in the glyph data. That is, these instructions provide glyph generator 112 the information to calculate the positions, shapes, and curves of the edges of the glyph. Knowing the positions, shapes, and curves of the glyph, region classifier 116 can classify the various geometrical regions created by the edges, such as whether an edge encloses or at least partially encloses an area of a document, e.g., an inner region, or whether the edge is an outermost edge of the glyph, identifying the outer region of the glyph, or any other geometrical region that may be classified.

In another aspect, geometrical regions of the glyph may be determined by the intersections of the glyph and text tiles. For instance, if a text tile has a single intersection, then the area in which the textile is located is likely an outer region, since the glyph intersects the text tile at the single location, and the text tile extends away from the glyph toward an edge of a document. If the text tile has more than one intersection with the glyph, the area in which the text tile is located is likely an inner region, since the text tile extends from one edge of the glyph to another edge of the glyph. Put another way, a portion of a text tile intersecting a glyph at a single location may be considered to be within an outer region. A portion of a text tile having two intersections with a glyph may be considered to be within an inner region. Thus, region classifier 116 can use the number of intersections between text tiles and the glyph to determine a geometric region of the glyph, and thus, the text can be inserted into text tiles within the document based on the classified geometrical region.

For instance, using configurable options, text may be inserted within an inner region of a glyph. Text may be inserted into an area that is classified as an outer region of the glyph. In aspects, text may be inserted into any one or more geometrical regions in any combination based on the desired effect selected using document editor 110.

Figure 6B:
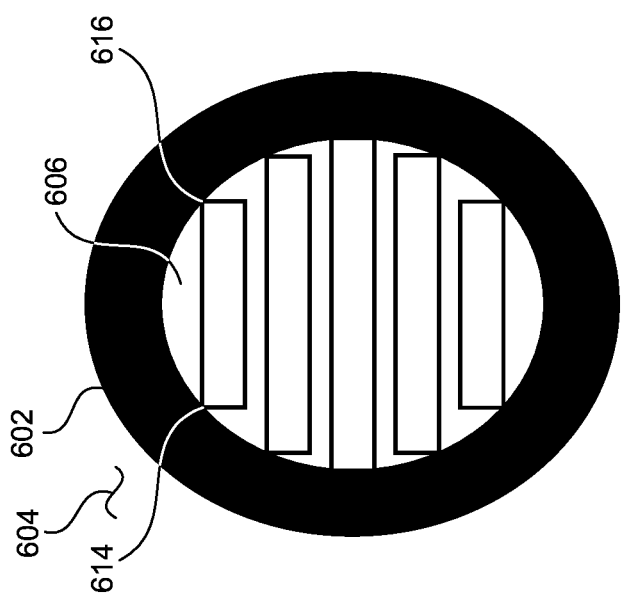
FIGS. 6A-6B illustrate an example in which text tiles are positioned within various regions of a glyph, in accordance with an aspect described herein.
Figure 6A:
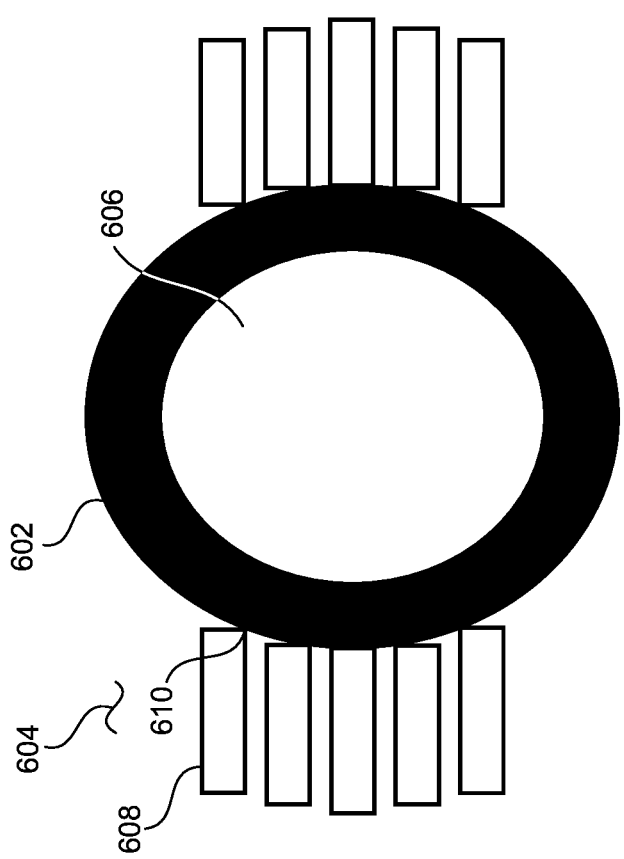

FIG. 6A and FIG. 6B illustrate an example of some geometrical regions for glyph 602. In FIG. 6A, the text tiles are shown positioned within outer region 604. Text tile portion 608 is a portion of a text tile. Text tile portion 608 intersects glyph 602 at a single location, illustrated as intersection 610. Based on this, region classifier 116 may classify text tile portion 608 as within outer region 604. Text may be inserted within text tile portion 608 at an insertion location and extend in a direction away from glyph 602.

FIG. 6B illustrates text tiles positioned within inner region 606. Text tile portion 612 is a portion of a text tile. In this example, text tile portion 612 is a portion of the same text tile corresponding to text tile portion 608 in FIG. 6A. Continuing with FIG. 6B, text tile portion 612 intersects glyph 602 at two locations, illustrated as first intersection 614 and second intersection 616. Based on this, region classifier 116 may classify text tile portion 612 as within inner region 606. In this example, text can be inserted within text tile portion 612 between first intersection 614 and second intersection 616. Said another way, the inserted text within text tile portion 612 may extend from a first insertion location determined based on first intersection 614 to a second insertion location determined based on second intersection 616.

Text inserter 118 may insert text within a document. As noted, text may be inserted at an insertion location and extend within a text tile away from the insertion location at which it is inserted. In an aspect, text is inserted such that the insertion location defines the location of a first character in a line of text within a text tile or portion thereof. In another aspect, text is inserted such that the insertion location defines the location of a last character in a line of text within a text tile or a portion thereof. In this way, text can be wrapped around any side of a glyph or within an inner region of a glyph.

Figure 7:

In aspects, text inserter 118 may insert text by generating text from a font file and rendering the text within a text tile. This may be done in a manner similar to that described with glyph generator 112. In an aspect, a glyph may be generated from a first font file. The inserted text wrapped around the glyph within the text tiles may be generated from a second font file defining a different font style. This allows various stylistic features to be rendered. FIG. 7 illustrates an example using document 700. Here, glyph 702 and glyph 704 have each been generated from a different font file, and thus, each has a unique font style. The inserted text 706 wrapped around these two glyphs is from a third font file that defines a font style different from those corresponding to glyph 702 and glyph 704.

Figure 8:
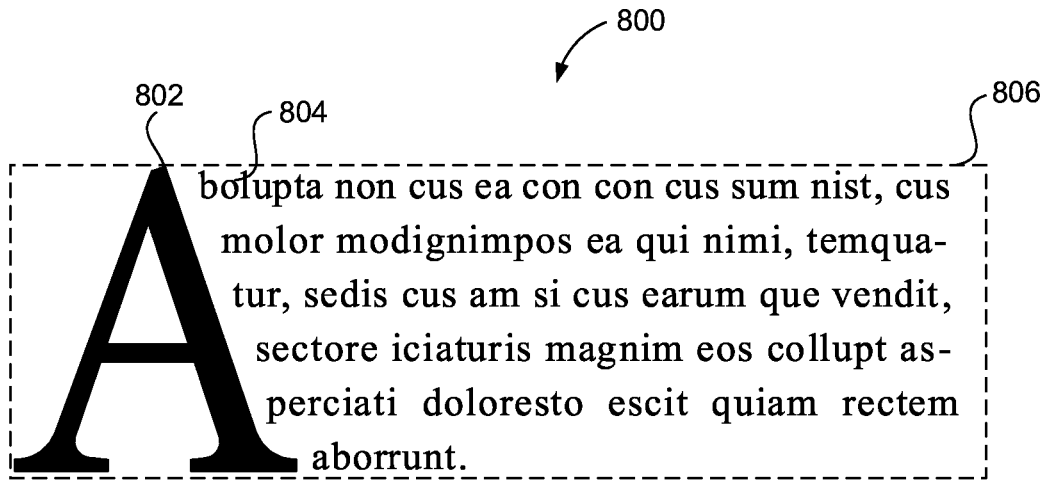

In another aspect, the font file may be the same for the glyph and the wrapped text. For example, FIG. 8 illustrates another document 800 comprising glyph 802. Text 804 has been wrapped around glyph 802. In this example, glyph 802 and text 804 are the same font style. Here, glyph 802 has been generated from a same font file as text 804.

In some cases, the glyph for which text has been wrapped around comprises a font size that is relatively larger than that of the wrapped text. Still looking to FIG. 8 as an example, glyph 802 comprises a font size that is relatively larger than that of text 804.

In an aspect, the font size of a glyph is increased based on the glyph being a first glyph in a text body. A text body may include the entire contents of a document. In an aspect, the text body is a portion of text within a body. This portion may be separated from other text based on features applied within document editor 110, such as the text body being a portion of text identified as a paragraph, e.g., based on an inserted return; a portion of text identified using a page break; a portion of text identified using a section break; and so forth. Document editor 110 may identify the first glyph within a text body and increase the font size of the glyph relative to text that is wrapped around the glyph. FIG. 8 illustrates an example where document 800 includes text 804, where text body 806 is a portion of the text determined based on it being a paragraph within document 800. In some cases, a first glyph is identified, and its corresponding font size is automatically increased relative to the wrapped text. This could be performed in response to a configurable setting applied to document editor 110 using computing device 104.

Figure 9:
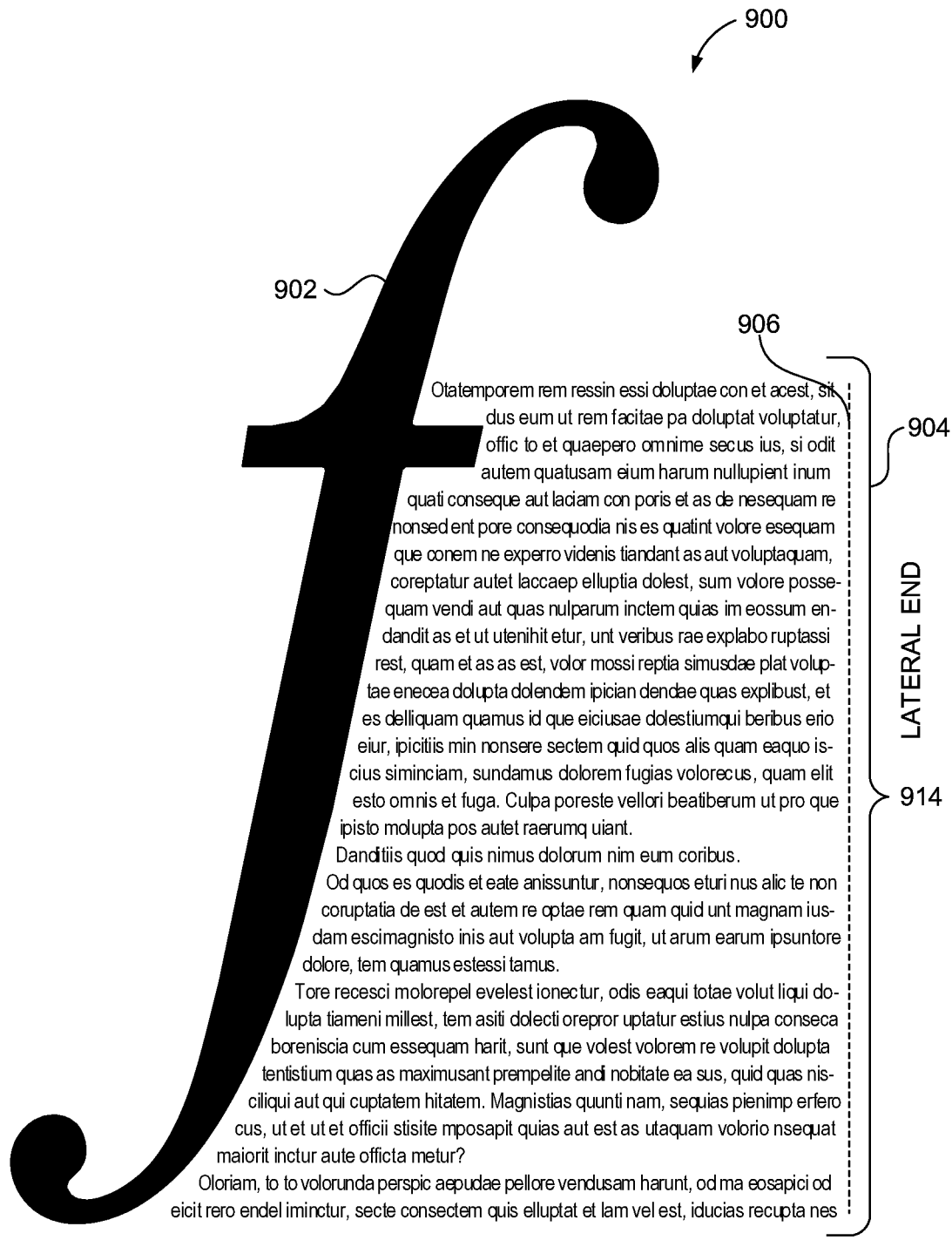

FIGS. 9-14 show some examples that can be produced using the technology described herein. FIG. 9 illustrates document 900. Document 900 comprises glyph 902 around which text 904 has been wrapped. The illustrated text 904 is text that is wrapped within an outer region of glyph 902. In this case, it extends away from glyph 902, being inserted using methods previously described, to margin 906 (illustrated using a dashed line) at a lateral end of document 900.

Figure 10:
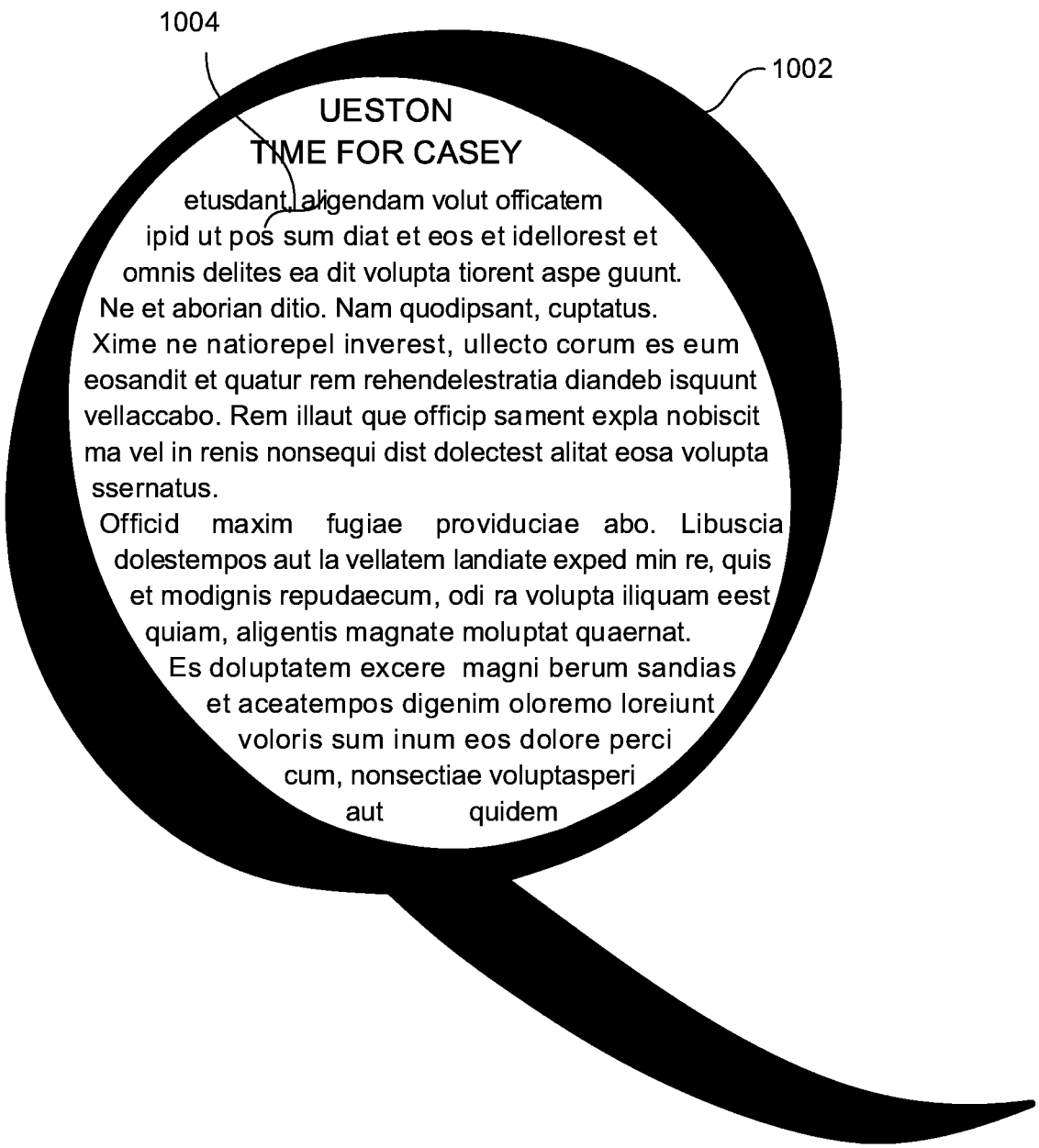

Another example is illustrated in FIG. 10. Here, document 1000 comprises glyph 1002. Text 1004 has been wrapped around glyph 1002. In this example, text 1004 is wrapped within an inner region of glyph 1002. As noted, document editor 110 may include configurable settings that, based on an input from computing device 104, wrap text within an inner region, as illustrated, within an outer region, or both.

Figure 11:
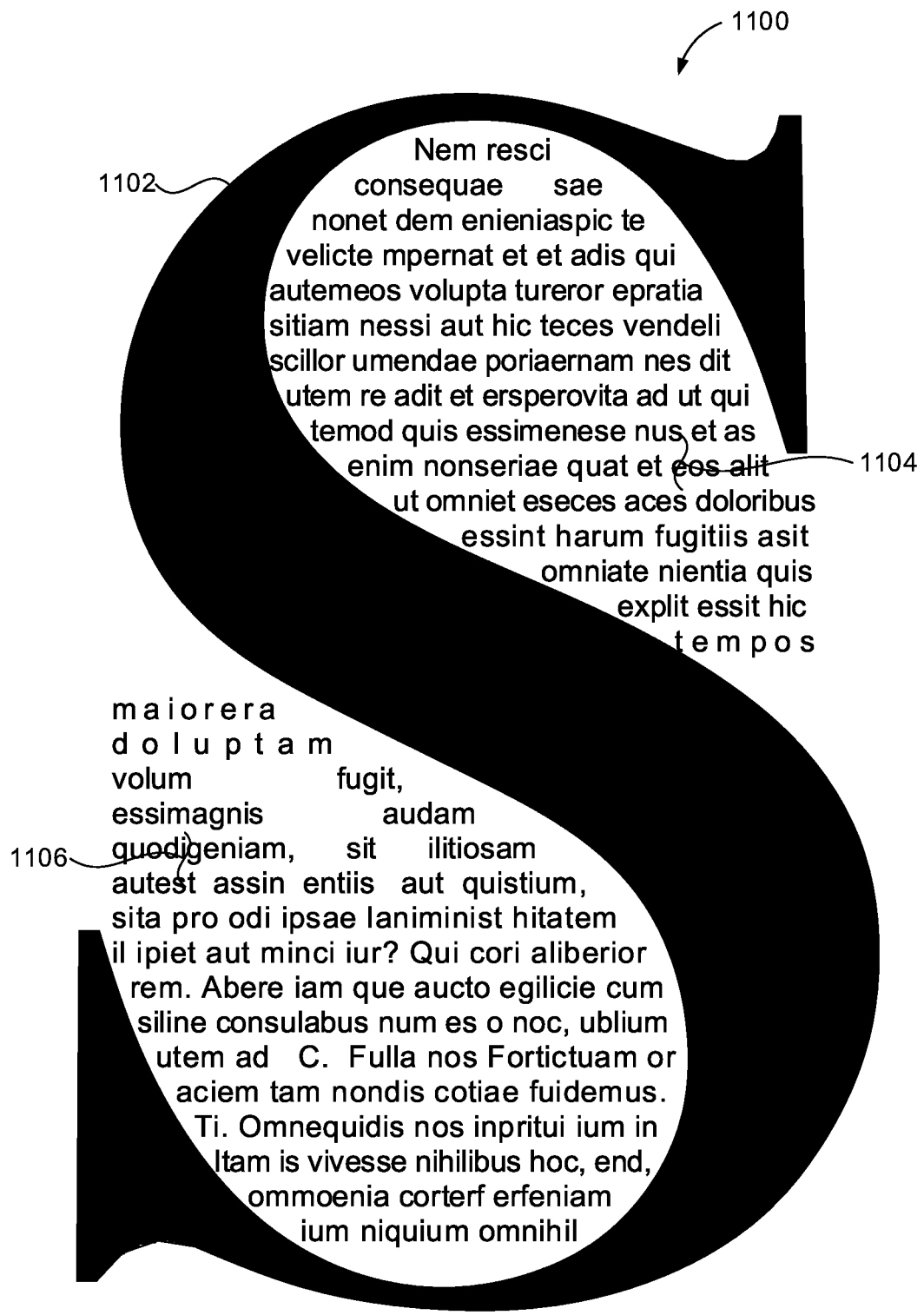

FIG. 11 provides yet another example. Document 1100 comprises glyph 1102, within which text 1104 and text 1106 have been wrapped. In this example, text 1104 and text 1106 are each wrapped within an inner region of glyph 1102.

Figure 12:
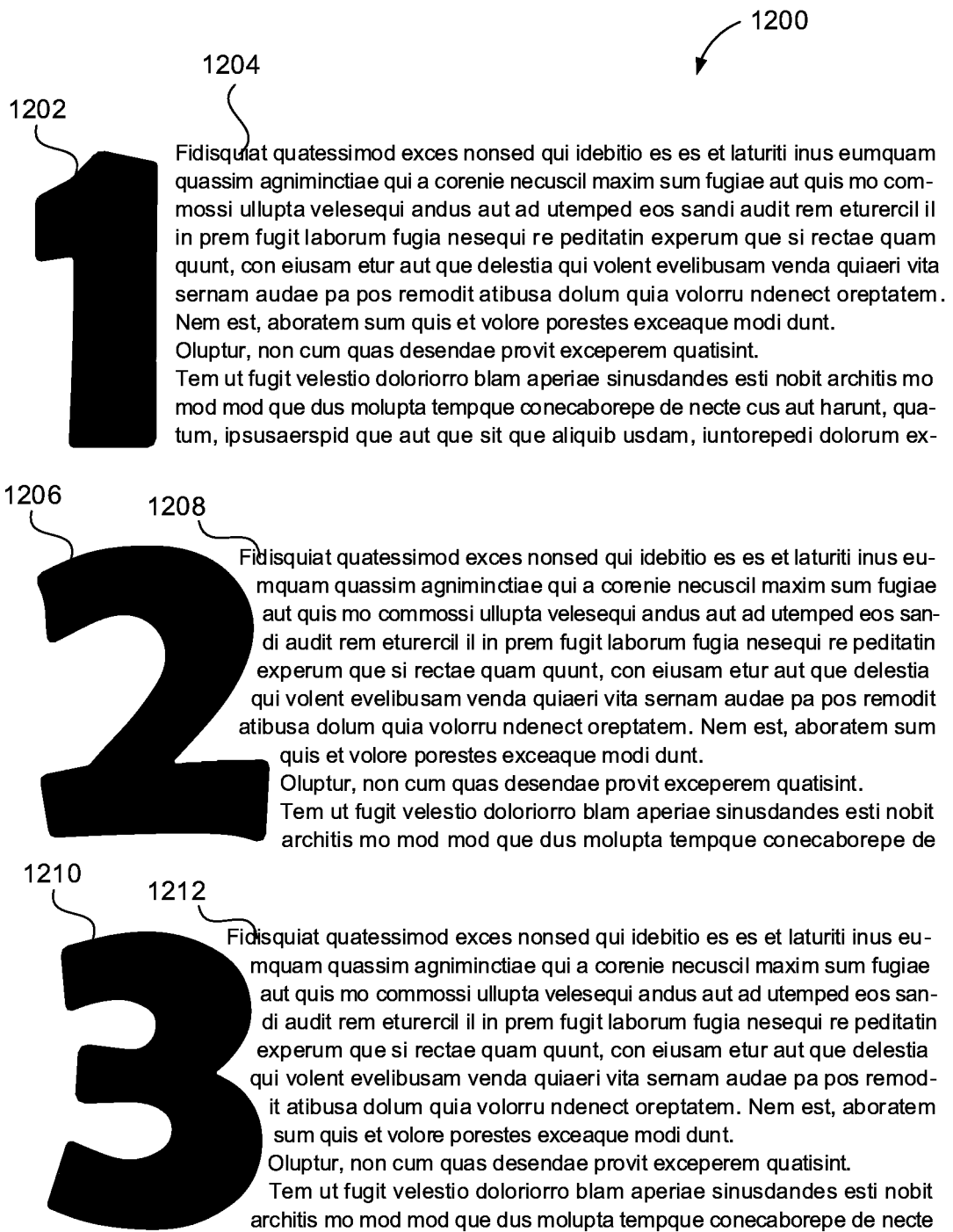

FIG. 12 provides another example. Document 1200 comprises glyph 1202 that is wrapped by text 1204. In this example, document 1200 also includes glyph 1206, which is wrapped by text 1208, and glyph 1210, which is wrapped by text 1212. Here, each of glyph 1202, glyph 1206, and glyph 1210 are the first glyph in a text body, which are paragraphs in this case. The font size of each of glyph 1202, glyph 1206, and glyph 1210 has been increased relative to text 1204, text 1208, and text 1212, respectively. As illustrated, document editor 110 may automatically increase the font size of the first glyph so that the upper boundary of the glyph edges corresponds with the beginning of the text body, while the lower boundary of the glyph edge corresponds to the end of the text body, creating the symmetry illustrated in FIG. 12.

FIG. 13 is another example. Document 1300 includes glyph 1302, which comprises an emoji, illustrated as an umbrella in this case. Glyph 1302 has been wrapped generally by text 1304.

Figure 14:
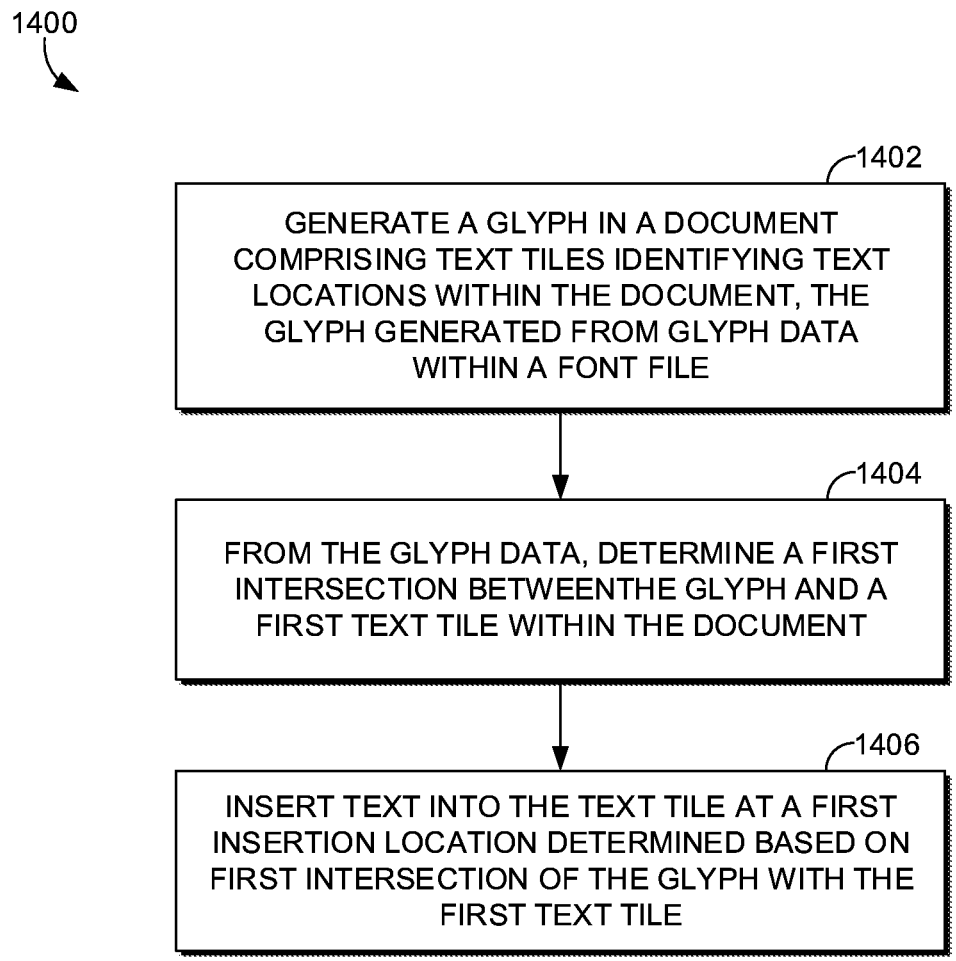
FIG. 14 illustrates a block diagram having an example method of wrapping a text-based glyph with text, in accordance with an aspect described herein.

With reference now to FIG. 14, a block diagram is provided that illustrates an example method 1400 for wrapping text around a glyph. At block 1402 a glyph is generated within a document. This may be performed using glyph generator 112 of document editor 110. In embodiments, the glyph is generated using glyph data within a font file. The document comprises text tiles, which include locations where text is or can be placed within a document.

At block 1404, an intersection between a text tile and the glyph is determined. This may be determined using location determiner 114. For instance, the text tile locations may be known based on document features applied to the document using document editor 110, such as headers, footers, document margins, paragraph spacing, line spacing, font size, and so on. The location of the glyph, e.g., the location of the glyph edges, can be determined from the glyph data of the font filed. Using this information, the intersections can be determined.

Based on the intersection of the glyph and the text tile, an insertion location may be determined using location determiner 114. The insertion location may be spaced apart from the intersection location and be located within the text tile. The insertion location may be theoretical in nature and identify a particular location within the document where text can be inserted to wrap around the glyph.

At block 1406, text is inserted at the insertion location. The text can be inserted within the text tile at the insertion location and extend away from the intersection. This provides the effect of wrapping the text around the glyph. The text can be inserted using text inserter 118.

In an aspect, geometrical regions of the glyph are classified. Using a computing device, such as computing device 104, document editor 110 can be employed to provide options for wrapping the text based on the geometrical region. For example, a text tile may lie within an outer region and the text wrapped around the glyph within the outer region. In another aspect, the text tile may lie within an inner region, and the text wrapped around the glyph within the inner region. In aspects of the technology, text is wrapped around the glyph in a combination of regions, such as both an inner and outer region.

In an aspect, the first glyph of a text body, such as a page, paragraph, bullet point, heading section, and the like, may be the glyph around which text is wrapped. The glyph may be generated from the same font file as the wrapped text, or may be generated from a different font file to provide a glyph comprising a different font style relative to the wrapped text.

In some cases, the glyph may comprise a font size that is relatively larger than that of the wrapped text. The font size may be automatically increased by document editor 110 relative to the text. In one example, the font size is increased to match a height of the text body wrapping the glyph. For instance, as vertical lines of text are wrapped, increasing the height of the text body, document editor 110 automatically increases the font of the glyph so that the height of the glyph is about equal to the height of the text body defined by the lines of text, e.g., a plurality of stacked text tiles comprising the wrapped text.

Figure 15:
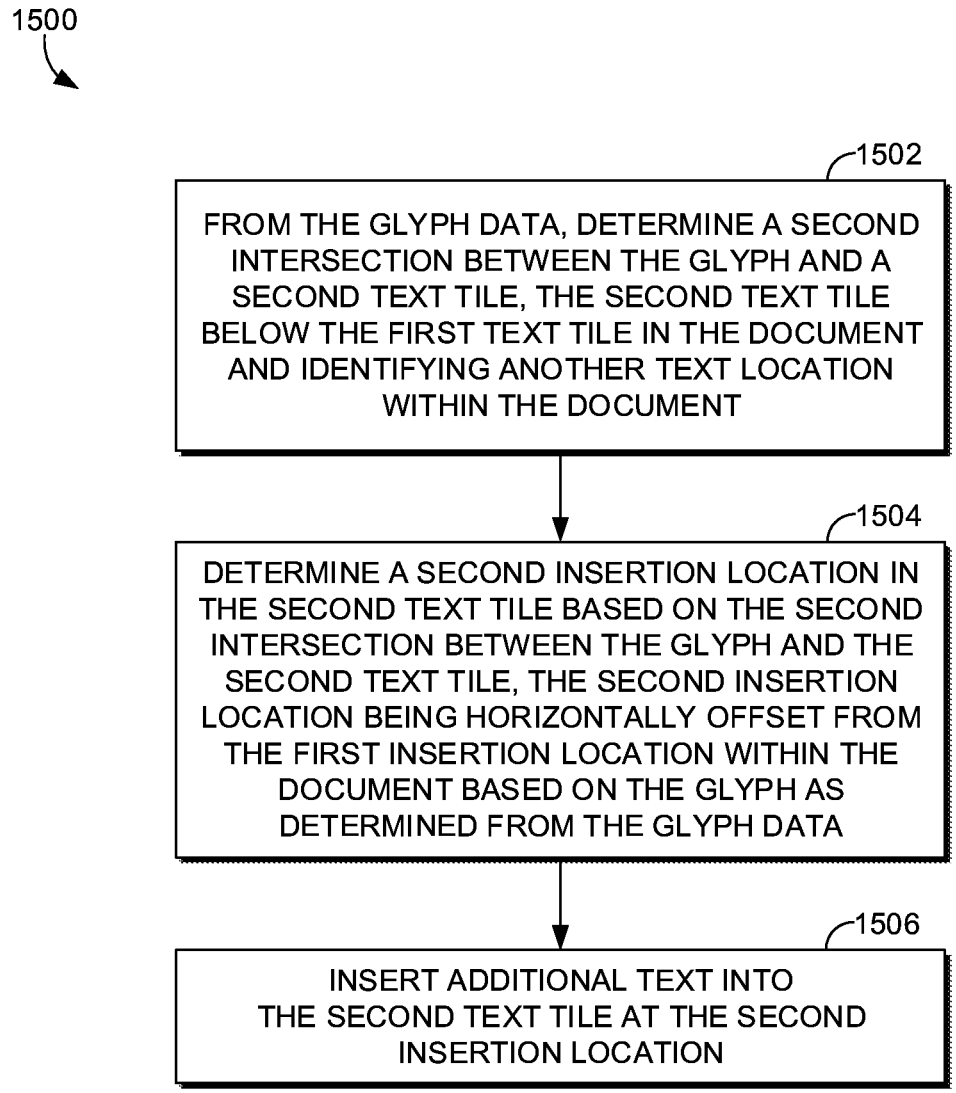
FIG. 15 illustrates a block diagram having another example method of wrapping a text-based glyph with text, in accordance with an aspect described herein.

With reference now to FIG. 15, FIG. 15 illustrates another block diagram having an example method 1500 for wrapping text within a document. In an aspect, method 1500 is performed in addition to method 1400.

At block 1502, a second intersection between the glyph and a second text tile is determined. This may be done by location determiner 114. The second text tile may be vertically stacked with the first text tile. The second text tile may be below or immediately below the first text tile. For instance, the second text tile may be vertically adjacent to the first text tile. The second text tile identifies a location where text is or can be placed. Put another way, a lower boundary of the first text tile may be adjacent to an upper boundary of the second text tile.

At block 1504, a second insertion location is determined. This may be done using location determiner 114. The second insertion location may be within the second text tile and spaced apart from the second intersection. The second text tile may be horizontally offset from the first text tile relative to lateral sizes of the document.

At block 1506, additional text is inserted into the second text tile at the second insertion location. The additional text may be inserted in the second text tile based on text within the first test tile extending from the insertion location to an end of the text tile, e.g., a margin of the document, or to another insertion location within the text tile. This gives the effect of multiple lines of text wrapping around the glyph.

With reference back to FIG. 14 and FIG. 15, block diagrams are provided and respectively illustrate methods 1400 and 1500 for wrapping text around a glyph. Each block of methods 1400 and 1500 may comprise a computing process performed using any combination of hardware, firmware, or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few possibilities. Methods 1400 and 1500 may be implemented in whole or in part by components of operating environment 100.

Figure 16:
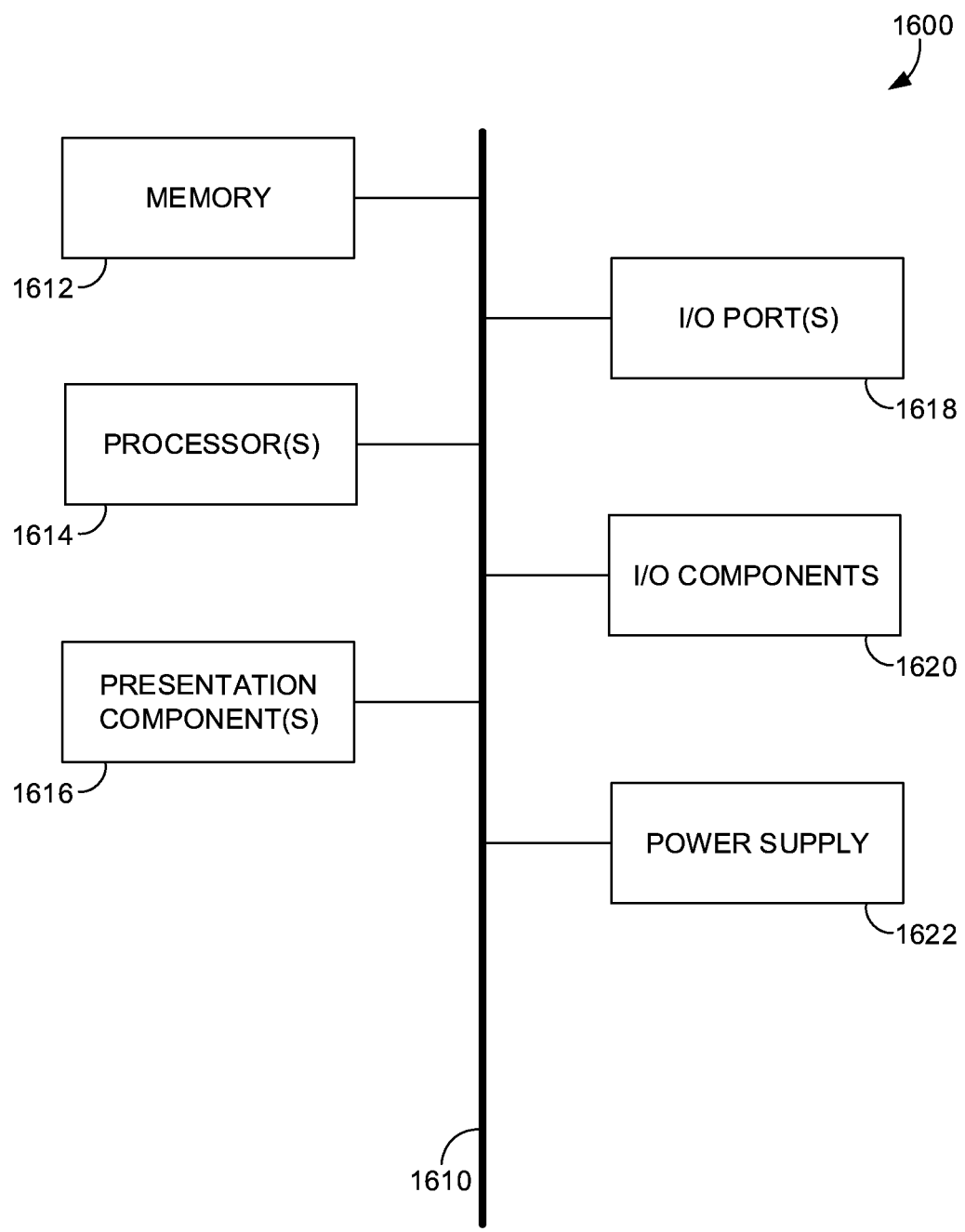
FIG. 16 illustrates an example computing device suitable for implementing aspects of the technology, in accordance with an aspect described herein.

Having described an overview of some embodiments of the present technology, an example computing environment in which embodiments of the present technology may be implemented is described below in order to provide a general context for various aspects of the present technology. Referring now to FIG. 16 in particular, an example operating environment for implementing embodiments of the present technology is shown and designated generally as computing device 1600. Computing device 1600 is but one example of a suitable computing environment and is not intended to suggest any limitation as to the scope of use or functionality of the technology. Computing device 1600 should not be interpreted as having any dependency or requirement relating to any one or combination of components illustrated.

The technology may be described in the general context of computer code or machine-useable instructions, including computer-executable instructions, such as program modules, being executed by a computer or other machine, such as a cellular telephone, personal data assistant or other handheld device. Generally, program modules, including routines, programs, objects, components, data structures, etc., refer to code that performs particular tasks or implements particular abstract data types. The technology may be practiced in a variety of system configurations, including handheld devices, consumer electronics, general-purpose computers, more specialty computing devices, etc. The technology may also be practiced in distributed computing environments where tasks are performed by remote-processing devices that are linked through a communications network.

With reference to FIG. 16, computing device 1600 includes bus 1610, which directly or indirectly couples the following devices: memory 1612, one or more processors 1614, one or more presentation components 1616, input/output (I/O) ports 1618, input/output components 1620, and illustrative power supply 1622. Bus 1610 represents what may be one or more buses (such as an address bus, data bus, or combination thereof). Although the various blocks of FIG. 16 are shown with lines for the sake of clarity, in reality, delineating various components is not so clear, and metaphorically, the lines would more accurately be grey and fuzzy. For example, one may consider a presentation component, such as a display device, to be an I/O component. Also, processors have memory. The inventors recognize that such is the nature of the art, and reiterate that the diagram of FIG. 16 is merely illustrative of an example computing device that can be used in connection with one or more embodiments of the present technology. Distinction is not made between such categories as "workstation," "server," "laptop," "handheld device," etc., as all are contemplated within the scope of FIG. 16 and with reference to "computing device."

Computing device 1600 typically includes a variety of computer-readable media. Computer-readable media can be any available media that can be accessed by computing device 1600 and includes both volatile and non-volatile media, and removable and non-removable media. By way of example, and not limitation, computer-readable media may comprise computer storage media and communication media. Computer storage media, also referred to as a communication component, includes both volatile and non-volatile, removable and non-removable media implemented in any method or technology for storage of information, such as computer-readable instructions, data structures, program modules, or other data. Computer storage media includes, but is not limited to, RAM, ROM, EEPROM, flash memory, or other memory technology; CD-ROM, digital versatile disks (DVDs), or other optical disk storage; magnetic cassettes, magnetic tape, magnetic disk storage, or other magnetic storage devices; or any other medium that can be used to store the desired information and that can be accessed by computing device 1600. Computer storage media does not comprise signals per se.

Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 1612 includes computer-storage media in the form of volatile or non-volatile memory. The memory may be removable, non-removable, or a combination thereof. Example hardware devices include solid-state memory, hard drives, optical-disc drives, etc. Computing device 1600 includes one or more processors that read data from various entities, such as memory 1612 or I/O components 1620. Presentation component(s) 1616 presents data indications to a user or other device. Example presentation components include a display device, speaker, printing component, vibrating component, etc.

I/O ports 1618 allow computing device 1600 to be logically coupled to other devices, including I/O components 1620, some of which may be built in. Illustrative components include a microphone, joystick, game pad, satellite dish, scanner, printer, wireless device, etc. The I/O components 1620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition, both on screen and adjacent to the screen, as well as air gestures, head and eye tracking, or touch recognition associated with a display of computing device 1600. Computing device 1600 may be equipped with depth cameras, such as stereoscopic camera systems, infrared camera systems, RGB (red-green-blue) camera systems, touchscreen technology, other like systems, or combinations of these, for gesture detection and recognition. Additionally, the computing device 1600 may be equipped with accelerometers or gyroscopes that enable detection of motion. The output of the accelerometers or gyroscopes may be provided to the display of computing device 1600 to render immersive augmented reality or virtual reality.

At a low level, hardware processors execute instructions selected from a machine language (also referred to as machine code or native) instruction set for a given processor. The processor recognizes the native instructions and performs corresponding low-level functions relating, for example, to logic, control, and memory operations. Low-level software written in machine code can provide more complex functionality to higher levels of software. As used herein, computer-executable instructions includes any software, including low-level software written in machine code; higher level software, such as application software; and any combination thereof. In this regard, components for wrapping text around a glyph can manage resources and provide the described functionality. Any other variations and combinations thereof are contemplated within embodiments of the present technology.

With reference briefly back to FIG. 1, it is noted and again emphasized that any additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of its components. Other arrangements and elements (e.g., machines, interfaces, functions, orders, and groupings of functions, etc.) can be used in addition to or instead of those shown, and some elements may be omitted altogether.

Further, some of the elements described in relation to FIG. 1, such as those described in relation to document editor 110, are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory, such as database 106. Moreover, functions of document editor 110, among other functions, may be performed by server 102, computing device 104, or any other component, in any combination.

Referring to the drawings and description in general, having identified various components in the present disclosure, it should be understood that any number of components and arrangements might be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, or software. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including," "having," and other like words and their derivatives have the same broad meaning as the word "comprising," and the word "accessing" comprises "receiving," "referencing," or "retrieving," or derivatives thereof. Further, the word "communicating" has the same broad meaning as the word "receiving," or "transmitting," as facilitated by software or hardware-based buses, receivers, or "transmitters" using communication media described herein.

In addition, words such as "a" and "an," unless otherwise indicated to the contrary, include the plural as well as the singular. Thus, for example, the constraint of "a feature" is satisfied where one or more features are present. The term "or" includes the conjunctive, the disjunctive, and both (a or b thus includes either a or b, as well as a and b).

For purposes of a detailed discussion above, embodiments of the present technology are described with reference to a distributed computing environment. However, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated by the accompanying drawings is to be interpreted as illustrative and not in a limiting sense.

Some example aspects that can be practiced from the forgoing description include the following:

Aspect 1: A system comprising: at least one processor; and one or more computer storage media storing computer readable instructions thereon that when executed by the at least one processor cause the at least one processor to perform operations comprising: accessing glyph data from a font file for generating text in a document; from the glyph data, determining a first intersection between a glyph and a first text tile identifying text location within the document; determining a first insertion location in the first text tile based on the first intersection of the glyph with the first text tile; inserting text into the first text tile at the first insertion location.

Aspect 2: Aspect 1, further comprising: from the glyph data, determining a second intersection between the glyph and a second text tile, the second text tile below the first text tile in the document and identifying another text location within the document; determining a second insertion location in the second text tile based on the second intersection between the glyph and the second text tile, the second insertion location being horizontally offset from the first insertion location within the document based on the glyph as determined from the glyph data; and inserting additional text into the second text tile at the second insertion location.

Aspect 3: Any of Aspects 1-2, further comprising classifying a geometrical region of the glyph based on the first intersection between the glyph and the first text tile, wherein the text is inserted according to the classified geometrical region.

Aspect 4: Aspect 3, wherein the geometrical region is classified as an outer region based on the first intersection being a single intersection, and the inserted text begins at the first insertion location and extends within the first text tile away from the first intersection.

Aspect 5: Aspect 3, wherein the geometrical region is classified as an inner region based on the first intersection between the glyph and the first text tile and a second intersection between the glyph and the first text tile, and wherein the inserted text extends within the first text tile between the first intersection and the second intersection.

Aspect 6: Any of Aspects 1-5, wherein the glyph and the inserted text are both generated from the font file.

Aspect 7: Any of Aspects 1-6, further comprising: identifying the glyph as a first glyph within a text body of the document; and based on the glyph being the first glyph within the text body of the document, automatically increasing a font size of the glyph relative to the inserted text.

Aspect 8: A method performed by one or more processors, the method comprising: generating a glyph in a document comprising text tiles identifying text locations within the document, the glyph generated from glyph data within a font file; from the glyph data, determining a first intersection between the glyph and a first text tile within the document; and inserting text into the text tile at a first insertion location determined based on first intersection of the glyph with the first text tile.

Aspect 9: Aspect 8, The method of claim 8, further comprising: from the glyph data, determining a second intersection between the glyph and a second text tile, the second text tile below the first text tile in the document; and inserting additional text into the second text tile at a second insertion location determined based on the second intersection between the glyph and the second text tile, the second insertion location being horizontally offset from the first insertion location within the document based on the glyph as determined from the glyph data.

Aspect 10: Any of Aspects 8-9, further comprising classifying a geometrical region of the glyph based on the first intersection between the glyph and the first text tile, wherein the text is inserted according to the classified geometrical region.

Aspect 11: Aspect 10, wherein the geometrical region is classified as an outer region based on the first intersection being a single intersection, and the inserted text begins at the first insertion location and extends within the first text tile away from the first intersection.

Aspect 12: Aspect 10, wherein the geometrical region is classified as an inner region based on the first intersection between the glyph and the first text tile and a second intersection between the glyph and the first text tile, and wherein the inserted text extends within the first text tile between the first intersection and the second intersection.

Aspect 13: Any of Aspects 8-12, wherein the glyph and the inserted text are both generated from the font file.

Aspect 14: Any of Aspects 8-13, further comprising: identifying the glyph as a first glyph within a text body of the document; and based on the glyph being the first glyph within the text body of the document, automatically increasing a font size of the glyph relative to the inserted text.

Aspect 15: One or more computer storage media storing computer readable instructions thereon that, when executed by a processor, cause the processor to perform operations comprising: generating a glyph in a document comprising text tiles identifying text locations within the document, the glyph generated from glyph data within a font file, and the glyph comprising a first font size; from the glyph data, determining a first intersection between the glyph and a first text tile within the document; and inserting text into the text tile at a first insertion location determined based on first intersection of the glyph with the first text tile, the inserted text comprising a second font size that is less than the first font size.

Aspect 16: Aspect 15, further comprising: from the glyph data, determining a second intersection between the glyph and a second text tile, the second text tile below the first text tile in the document; and inserting additional text into the second text tile at a second insertion location determined based on the second intersection between the glyph and the second text tile, the second insertion location being horizontally offset from the first insertion location within the document based on the glyph as determined from the glyph data, the additional text comprising the second font size.

Aspect 17: Any of Aspects 15-16, further comprising classifying a geometrical region of the glyph based on the first intersection between the glyph and the first text tile, wherein the text is inserted according to the classified geometrical region.

Aspect 18: Aspect 17, wherein the geometrical region is classified as an outer region based on the first intersection being a single intersection, and the inserted text begins at the first insertion location and extends within the first text tile away from the first intersection.

Aspect 19: Aspect 17, wherein the geometrical region is classified as an inner region based on the first intersection between the glyph and the first text tile and a second intersection between the glyph and the first text tile, and wherein the inserted text extends within the first text tile between the first intersection and the second intersection.

Aspect 20: Any of Aspects 15-19, wherein the glyph and the inserted text are both generated from the font file.

What is claimed is:

1. A system comprising:
   at least one processor; and
   one or more computer storage media storing computer readable instructions thereon that when executed by the at least one processor cause the at least one processor to perform operations comprising:
   accessing glyph data from a font file for generating text in a document;
   calculating from the glyph data a first intersection between a glyph, having been generated from the glyph data of the font file, and a first text tile identifying text location within the document, the first intersection calculated by identifying a location of the first text tile that is the same as a location on a Bézier curve calculated according to the font file for control points of the glyph;
   determining a first insertion location in the first text tile based on the first intersection of the glyph with the first text tile; and
   inserting text into the first text tile at the first insertion location.

2. The system of claim 1, further comprising:
   from the glyph data, calculating a second intersection between the glyph and a second text tile, the second text tile below the first text tile in the document and identifying another text location within the document;
   determining a second insertion location in the second text tile based on the second intersection between the glyph and the second text tile, the second insertion location being horizontally offset from the first insertion location within the document based on the glyph as determined from the glyph data; and
   inserting additional text into the second text tile at the second insertion location.

3. The system of claim 1, further comprising classifying a geometrical region of the glyph based on the first intersection between the glyph and the first text tile, wherein the text is inserted according to the classified geometrical region.

4. The system of claim 3, wherein the geometrical region is classified as an outer region based on the first intersection being a single intersection, and the inserted text begins at the first insertion location and extends within the first text tile away from the first intersection.

5. The system of claim 3, wherein the geometrical region is classified as an inner region based on the first intersection between the glyph and the first text tile and a second intersection between the glyph and the first text tile, and wherein the inserted text extends within the first text tile between the first intersection and the second intersection.

6. The system of claim 1, wherein the glyph and the inserted text are both generated from the font file.

7. The system of claim 1, further comprising:
   identifying the glyph as a first glyph within a text body of the document; and
   based on the glyph being the first glyph within the text body of the document, automatically increasing a font size of the glyph relative to the inserted text.

8. A method performed by one or more processors, the method comprising:
- generating a glyph in a document comprising text tiles identifying text locations within the document, the glyph generated from glyph data within a font file;
- from the glyph data, calculating a first intersection between a Bézier curve of the glyph and a first text tile within the document, the Bézier curve calculated according to the font file for control points of the glyph; and
- inserting text into the text tile at a first insertion location determined based on first intersection of the glyph with the first text tile.

9. The method of claim 8, further comprising:
- from the glyph data, calculating a second intersection between the Bézier curve and a second text tile, the second text tile below the first text tile in the document; and
- inserting additional text into the second text tile at a second insertion location determined based on the second intersection between the Bézier curve and the second text tile, the second insertion location being horizontally offset from the first insertion location within the document based on the glyph as determined from the glyph data.

10. The method of claim 8, further comprising classifying a geometrical region of the glyph based on the first intersection between the Bézier curve and the first text tile, wherein the text is inserted according to the classified geometrical region.

11. The method of claim 10, wherein the geometrical region is classified as an outer region based on the first intersection being a single intersection, and the inserted text begins at the first insertion location and extends within the first text tile away from the first intersection.

12. The method of claim 10, wherein the geometrical region is classified as an inner region based on the first intersection between the Bézier curve and the first text tile and a second intersection between the Bézier curve and the first text tile, and wherein the inserted text extends within the first text tile between the first intersection and the second intersection.

13. The method of claim 8, wherein the glyph and the inserted text are both generated from the font file.

14. The method of claim 8, further comprising:
- identifying the glyph as a first glyph within a text body of the document; and
- based on the glyph being the first glyph within the text body of the document, automatically increasing a font size of the glyph relative to the inserted text.

15. One or more computer storage media storing computer readable instructions thereon that, when executed by a processor, cause the processor to perform operations comprising:
- generating a glyph in a document comprising text tiles identifying text locations within the document, the glyph comprising a Bézier curve generated from glyph data within a font file, and the glyph comprising a first font size;
- from the glyph data, determining a first intersection between the Bézier curve of the glyph and a first text tile within the document for wrapping text of the first text tile around the glyph, the first intersection calculated by identifying a location of the first text tile that is the same as a location on the Bézier curve; and
- inserting the text into the text tile at a first insertion location determined based on first intersection of the glyph with the first text tile, the inserted text comprising a second font size that is less than the first font size.

16. The media of claim 15, further comprising:
- from the glyph data, determining a second intersection between the Bézier curve of the glyph and a second text tile, the second text tile below the first text tile in the document, and the second intersection determined for wrapping additional text of the second text tile around the glyph; and
- inserting the additional text into the second text tile at a second insertion location determined based on the second intersection between the glyph and the second text tile, the second insertion location being horizontally offset from the first insertion location within the document based on the glyph as determined from the glyph data, the additional text comprising the second font size.

17. The media of claim 15, further comprising classifying a geometrical region of the glyph based on the first intersection between the glyph and the first text tile, wherein the text is inserted according to the classified geometrical region.

18. The media of claim 17, wherein the geometrical region is classified as an outer region based on the first intersection being a single intersection, and the inserted text begins at the first insertion location and extends within the first text tile away from the first intersection.

19. The media of claim 17, wherein the geometrical region is classified as an inner region based on the first intersection between the glyph and the first text tile and a second intersection between the glyph and the first text tile, and wherein the inserted text extends within the first text tile between the first intersection and the second intersection.

20. The media of claim 15, wherein the glyph and the inserted text are both generated from the font file.

* * * * *